(12) United States Patent
Wimbert et al.

(10) Patent No.: US 6,991,357 B2
(45) Date of Patent: Jan. 31, 2006

(54) LAMP

(75) Inventors: Frank Wimbert, Eisenach (DE); Horst Deichmüller, Eisenach (DE)

(73) Assignee: FER Fahrzeugelektrik GmbH, Eisenach (DE)

( * ) Notice: Subject to any disclaimer, the term of this patent is extended or adjusted under 35 U.S.C. 154(b) by 27 days.

(21) Appl. No.: 10/682,812

(22) Filed: Oct. 10, 2003

(65) Prior Publication Data

US 2005/0073229 A1   Apr. 7, 2005

(30) Foreign Application Priority Data

| Oct. 10, 2002 | (DE) | ................. 102 47 328 |
| Dec. 23, 2002 | (DE) | ............. 202 19 896 U |
| Feb. 24, 2003 | (DE) | ................. 103 07 806 |

(51) Int. Cl.
  *F21V 7/04*       (2006.01)
(52) U.S. Cl. .................... 362/603; 362/323; 362/327
(58) Field of Classification Search ........ 362/540–541, 362/511, 545, 331, 603, 323, 327
  See application file for complete search history.

(56) References Cited

U.S. PATENT DOCUMENTS

| 3,532,871 | A | * | 10/1970 | Shipman ..................... 362/506 |
| 5,046,805 | A | * | 9/1991 | Simon .......................... 385/31 |
| 6,097,549 | A | * | 8/2000 | Jenkins et al. .............. 359/726 |
| 6,102,559 | A | * | 8/2000 | Nold et al. .................. 362/558 |
| 6,811,277 | B2 | * | 11/2004 | Amano ........................ 362/31 |
| 6,824,284 | B2 | * | 11/2004 | Chinniah et al. ............. 362/27 |

FOREIGN PATENT DOCUMENTS

| DE | 0704655 | * | 3/1996 |
| DE | 196 38 081 A1 | | 3/1998 |
| WO | WO 99/08042 A1 | | 2/1999 |

* cited by examiner

*Primary Examiner*—Ali Alavi
(74) *Attorney, Agent, or Firm*—Sughrue Mion, PLLC

(57) ABSTRACT

A lamp, in particular a motor vehicle lamp, comprises a light distribution device (14, 14') into which the light of at least one light source (6) is fed in such a way as to produce a light flux which is firstly propagated through the light distribution device substantially parallel to a light exit surface defined thereby. Components are deflected out of the light flux by means of coupling-out structures (16, 16') for delivery through the light exit surface. To achieve good illumination of the light-transmitting surface the coupling-out structures are a plurality of coupling-out layers which are arranged at spacings in succession in the direction of propagation of the light flux and which comprise a medium whose optical refractive index is different from that of the medium filling the intermediate spaces between said layers, wherein the coupling-out layers are so inclined relative to the propagation direction of the light flux at a predetermined angle that its main component passes through them without a substantial change in direction while a minor part is reflected towards the light exit surface.

56 Claims, 11 Drawing Sheets

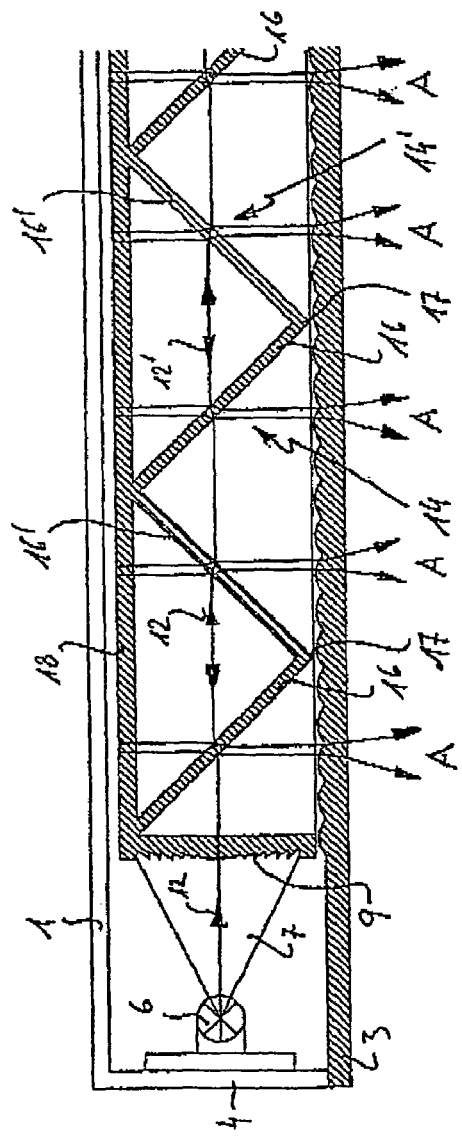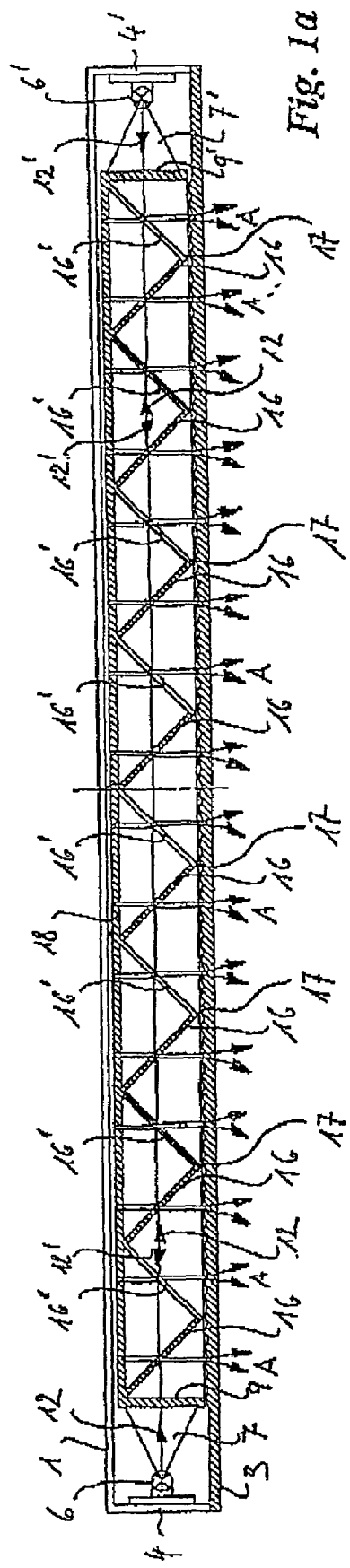

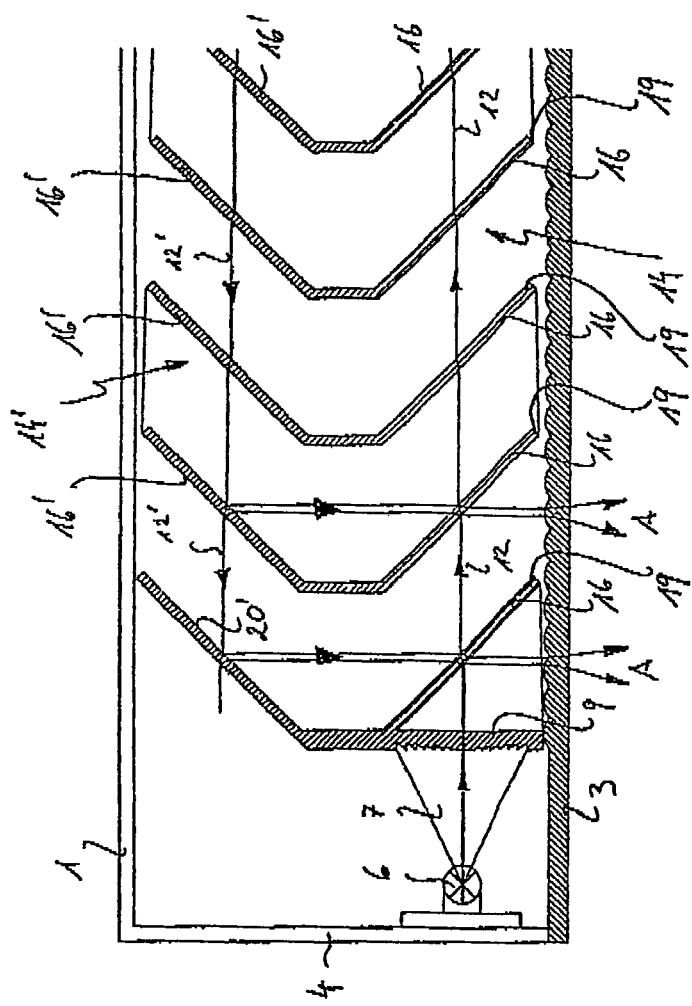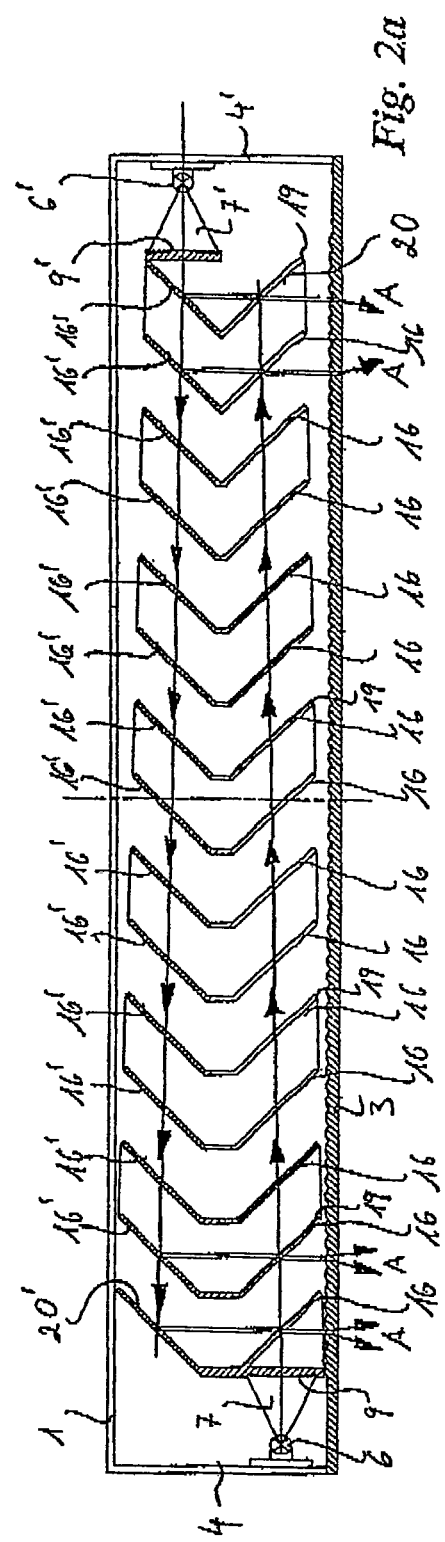

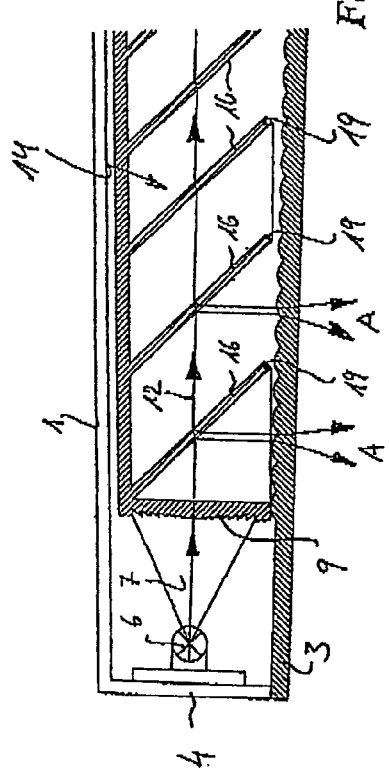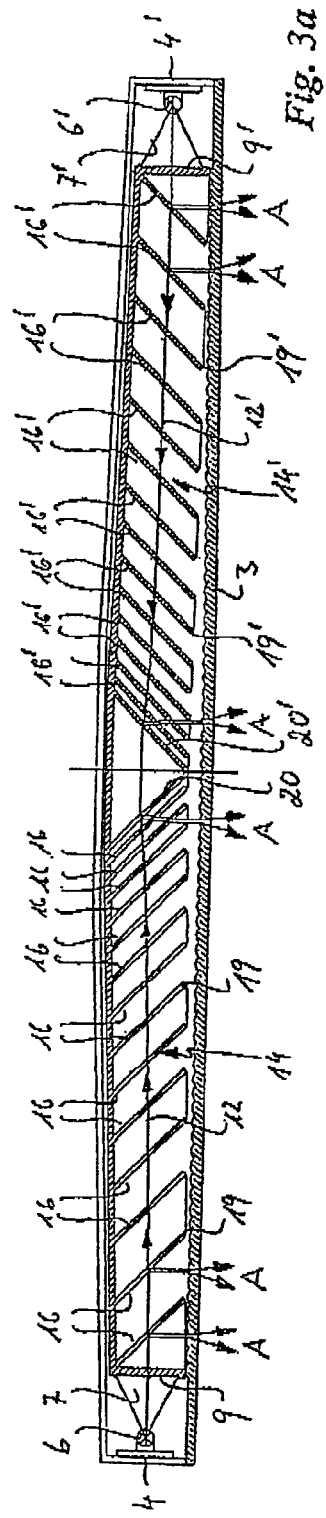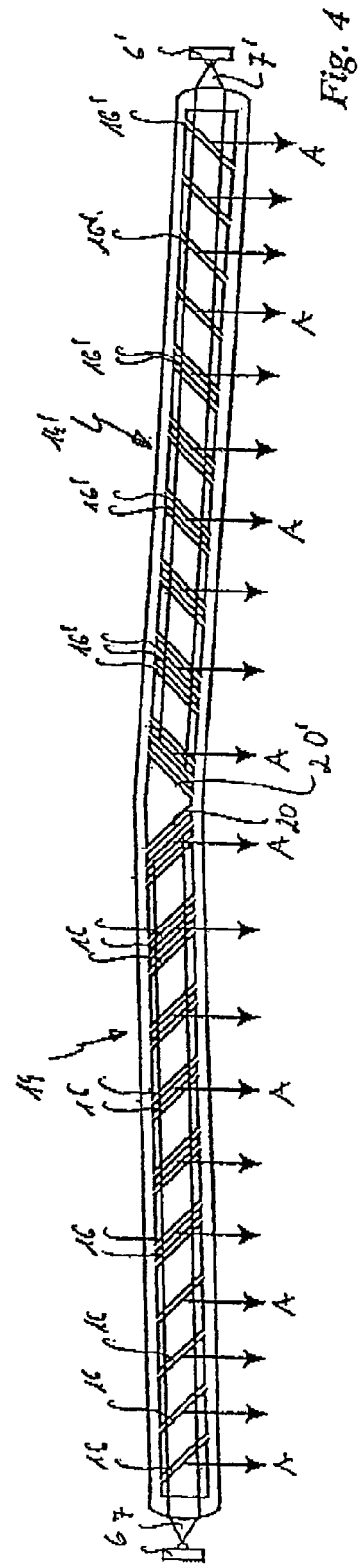

Figure 5:
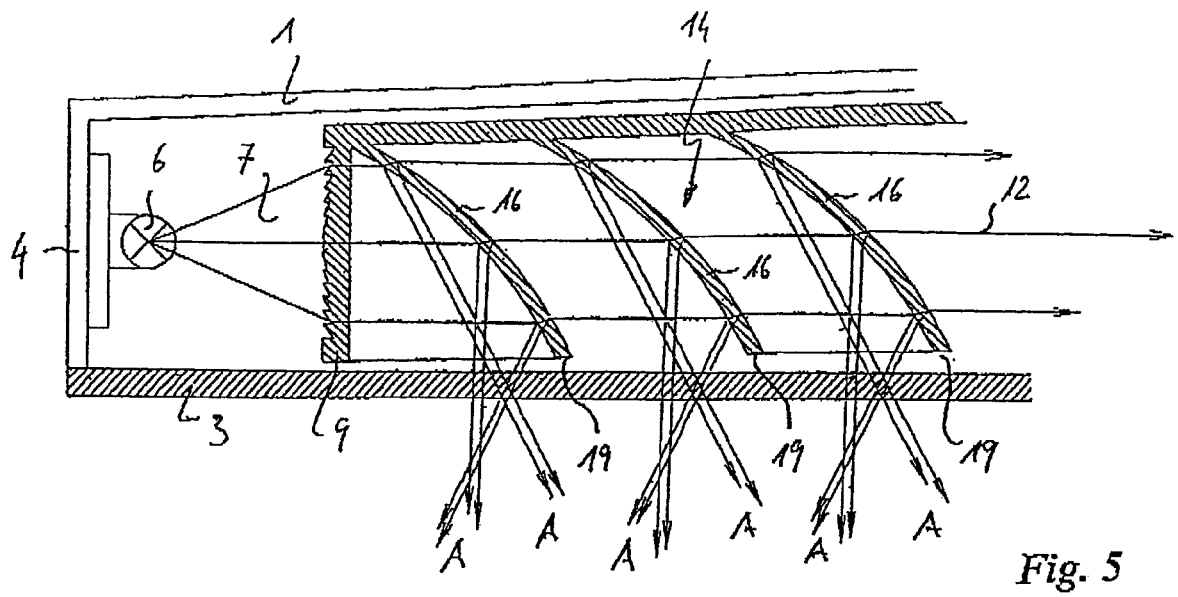

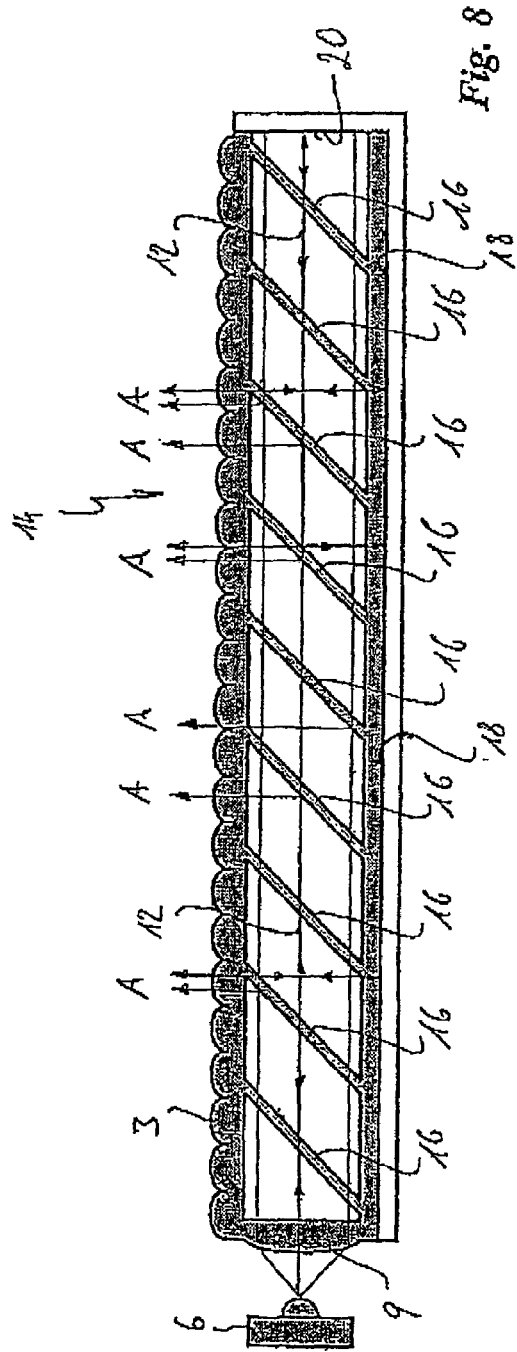
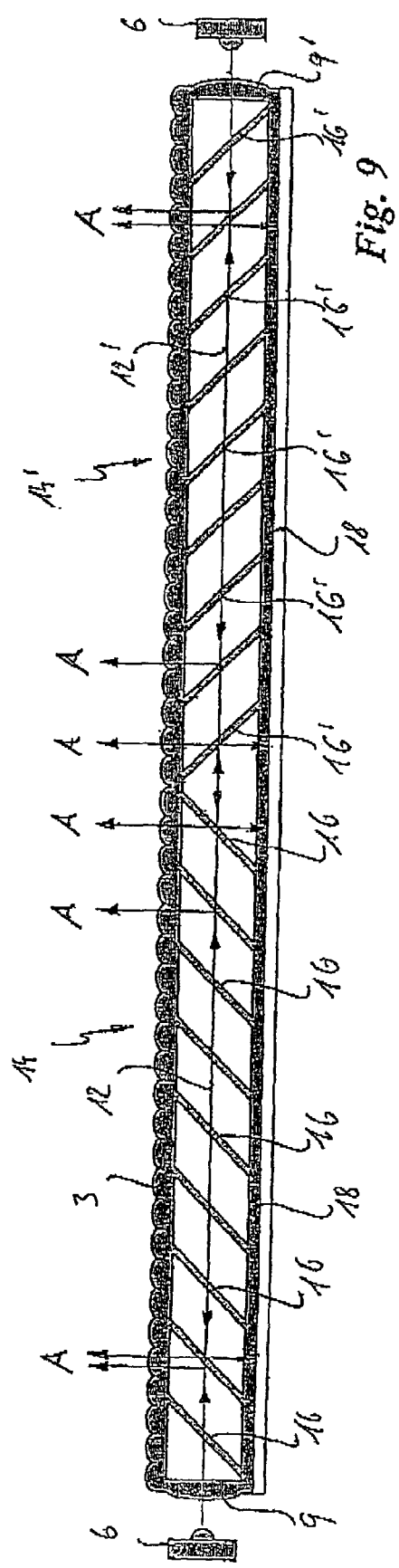

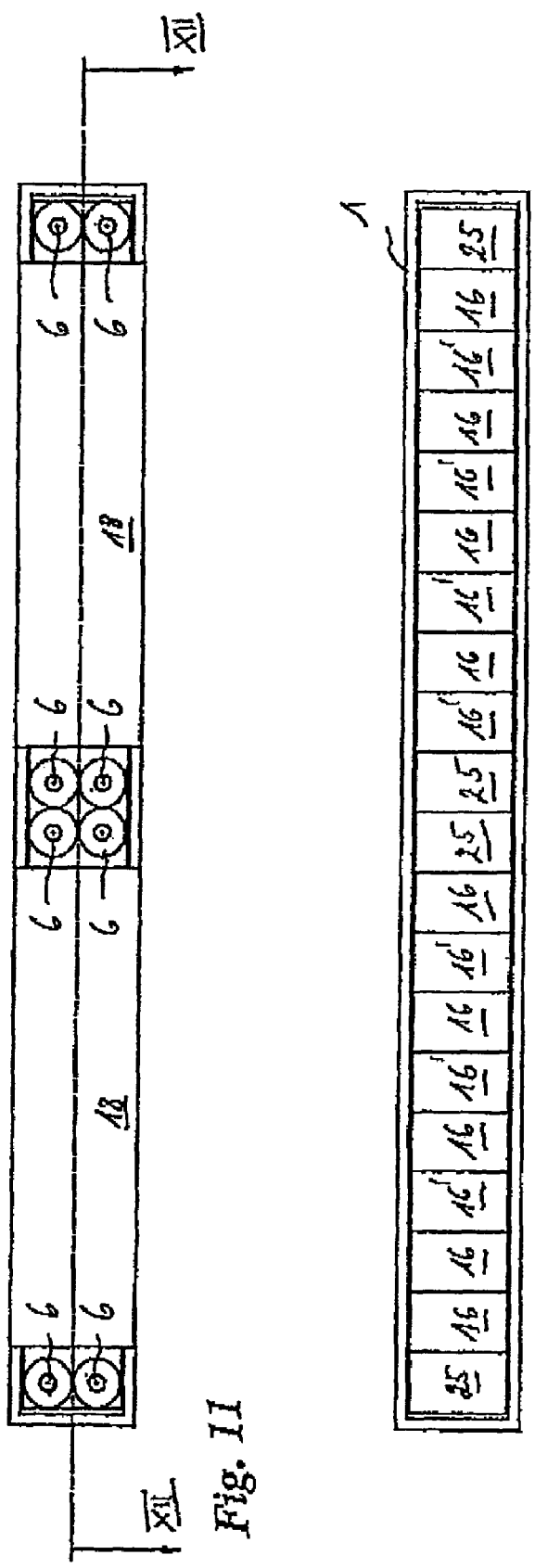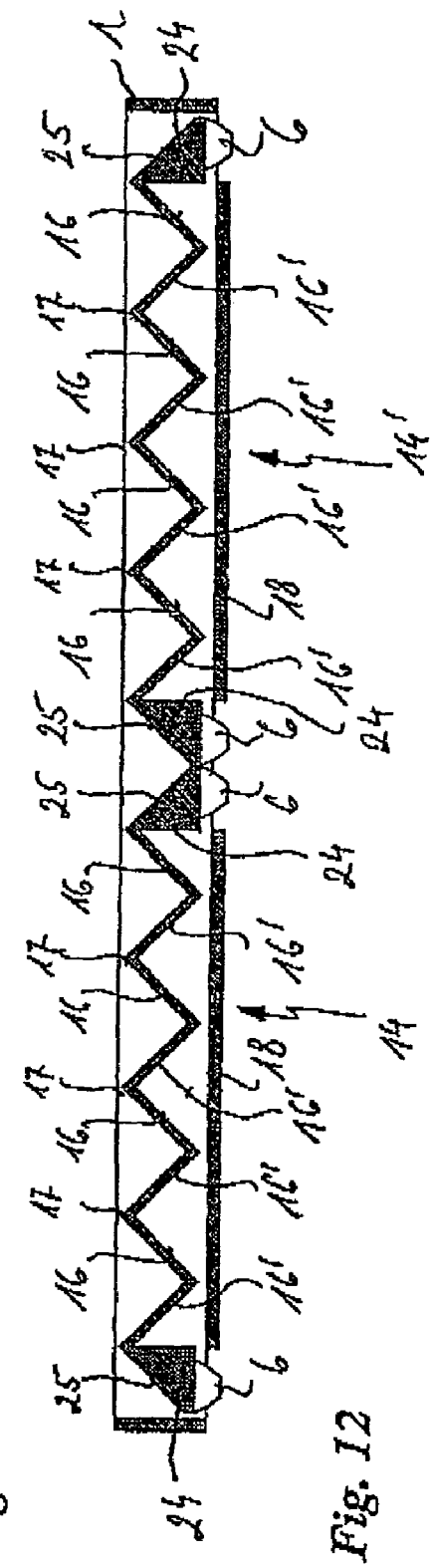

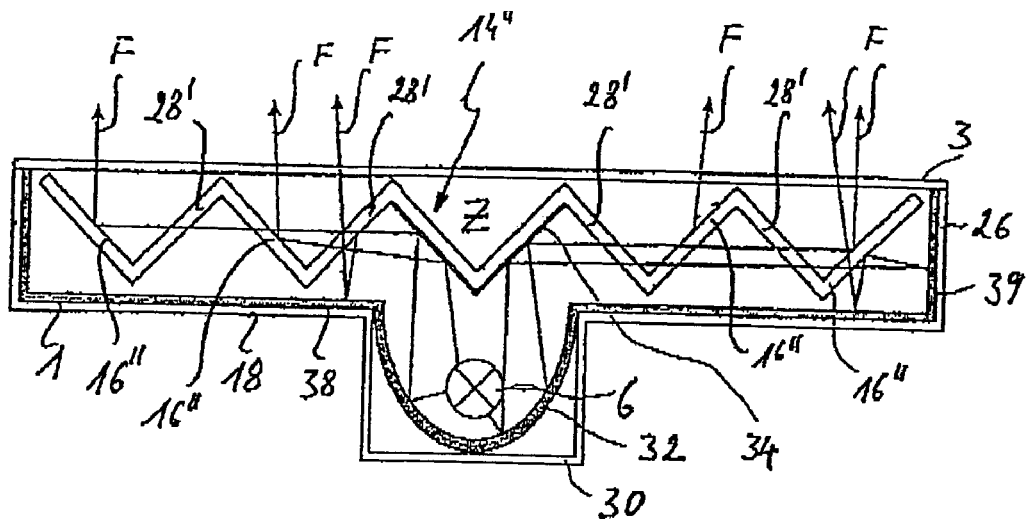
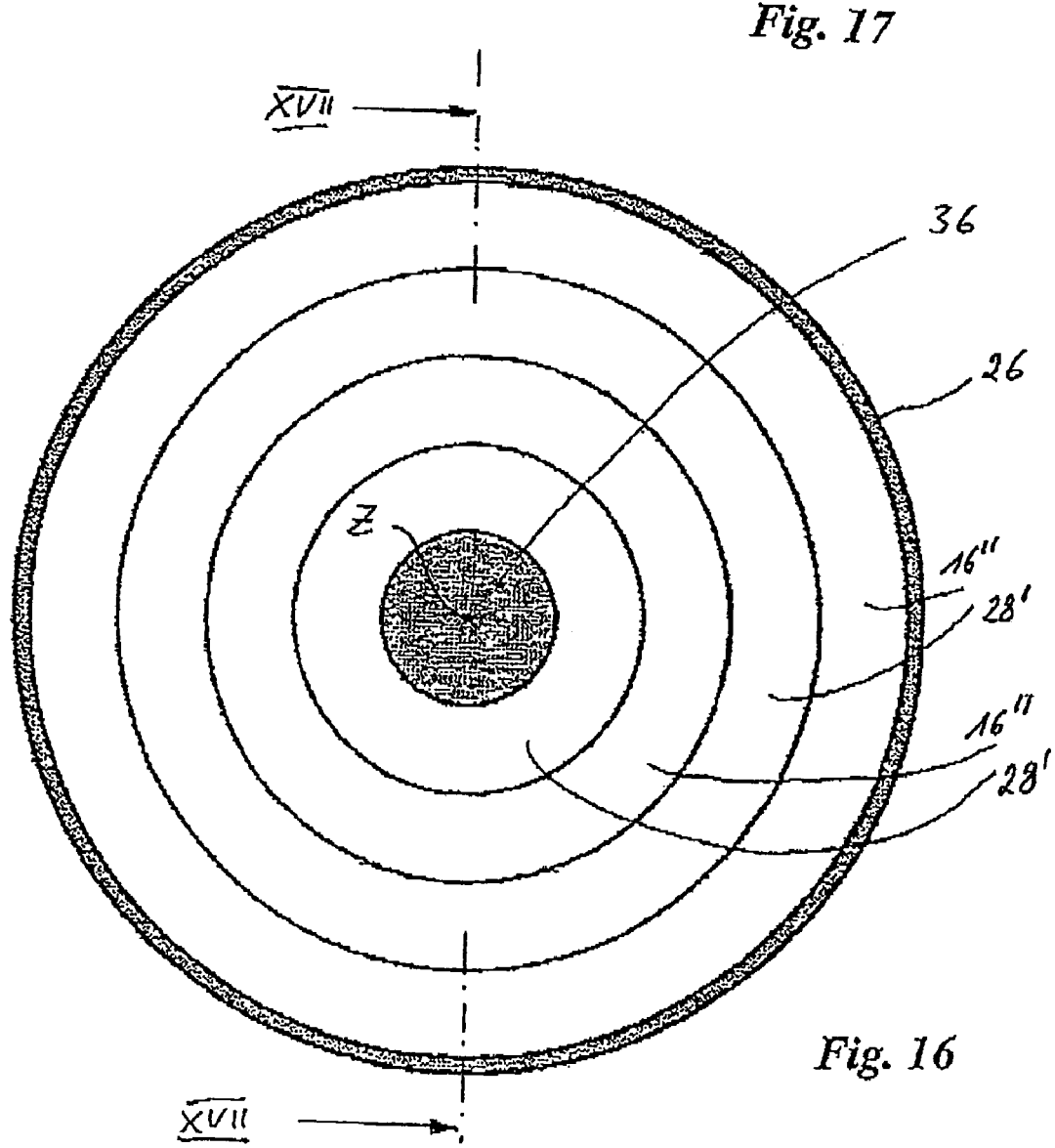
Fig. 17
Fig. 16

LAMP

The invention concerns a lamp, in particular a vehicle lamp, as set forth in the classifying portion of claim 1.

In particular the use of high-set brake lamps for motor vehicles has given rise to a need for vehicle lamps in which the light-transmitting cover thereof, in the position of installation transversely with respect to the direction of view of the person observing same, is of a great length and a height which is small in comparison therewith.

In order for the light-transmitting cover of such a lamp to have the light shining uniformly therethrough, it is the usual practice in accordance with the state of the art to provide therebehind at least one elongate row of mutually juxtaposed light sources which are generally light emitting diodes. For somewhat higher designs, it is also possible for a plurality of such elongate rows to be arranged one above the other.

A disadvantage with those known lamps is the large number of individual light sources, which results in an increased level of expenditure in terms of holding structure and wiring, and also an increased risk of failure. It is particularly disadvantageous in this respect that the driver of the motor vehicle in question either does not at all perceive the failure of a few of those many light sources or considers such failure to be inconsequential and therefore does not attend to speedy replacement. Particularly if the failure of individual light sources has the result that a following road user no longer sees the high-set brake lamp as a single unitary lamp but as two separate lamps, that can give rise to serious irritation, particularly when the viewing conditions are poor.

Furthermore EP 1 002 187 discloses a vehicle lamp in which the light of one or more light emitting diodes is coupled into the end of an elongate, curved light guide body which passes a part of that light by total reflection around the curvature thereof in order to emit it at the opposite end, while other light components are deflected by step-like coupling-out structures incorporated into the rear main face of the light guide body and are emitted through the front main face.

The object of the present invention is to develop a lamp of the kind set forth in the opening part of this specification, in such a way that substantially uniform illumination of an area-covering light-transmitting cover is possible even with a small number of light sources.

To attain that object, the invention provides the features set forth in claim 1.

As the light-transmitting cover to be illuminated does not necessarily have to be flat, it is appropriate to refer to a light-transmitting surface to be transilluminated, which is the 'plan surface' of the light-transmitting cover, which can be imagined as the parallel projection of the light-transmitting cover in opposite relationship to the main emission direction of the lamp on to a plane which is behind the light-transmitting cover. That light-transmitting surface can be the surface of a solid body or immaterial. The former is the case when dealing with light-transmitting covers with a flat rear side which is then equal to the above-mentioned light-transmitting surface.

In accordance with the structure set forth in claim 1, which in principle manages with a single light source of adequate light strength, the light beam emanating from that light source is so directed that it is propagated substantially parallel to the light-transmitting surface. The expression 'substantially parallel' is intended in that case also to embrace the situations in which the main propagation direction of the light beam includes with that surface a small acute angle.

Arranged in the path of the light beam is a light distribution device including a plurality of coupling-out layers which are inclined at an angle, preferably 45°, with respect to the longitudinal direction of the light beam. Those coupling-out layers may for example comprise a transparent solid body material and are then preferably integrally connected together by means of connecting legs which can be disposed outside the light beam or in its edge regions which do not directly adjoin the light-transmitting cover.

As an alternative thereto it is possible for the coupling-out layers to be formed by air-filled slots provided in a transparent solid body.

It is essential in both cases that the optical refractive indices of the medium filling the coupling-out layers on the one hand and the medium surrounding them on the other hand are so different that, with the given angle of inclination, each time the parallelised light beam passes through one of said coupling-out layers, a given part of the light, for example 10%, is coupled out transversely, preferably perpendicularly, with respect to the longitudinal axis of the parallelised light beam by virtue of interface reflection towards the light-transmitting surface.

Each of those coupling-out layers thus acts like its own light source for a person viewing same, who is looking from the outside on to the light-transmitting surface.

As the intensity of the coupled-out light component is always proportional to the intensity of the light impinging on the coupling-out layer in question, the intensity of the light component which is coupled out at each individual coupling-out layer decreases with increasing distance from the light source as the parallelised light beam which is propagated in the longitudinal direction becomes progressively weaker with increasing distance, by virtue of the coupling-out losses.

In order nonetheless to illuminate for example an elongate light-transmitting surface at least so uniformly that there are no differences in brightness which are strikingly apparent to the human eye, the invention provides various possible solutions.

One possibility involves using two light beams which can be derived from one and the same or from two different light sources and providing that those two light beams pass substantially parallel to the light-transmitting surface but with an opposite direction of propagation, that is to say in mutually opposite relationship, wherein each of the two light beams has its own light distribution device of the above-described kind. That arrangement provides that, in the regions of the light-transmitting surface in which only components of comparatively low intensity are still being coupled out of the one light beam, the intensity of the components which are coupled out of the other light beam in the same region is particularly high, and vice-versa. In that case, both light beams produce components of substantially equal intensity at the center of the arrangement.

A further option involves using only one light beam and increasing the number of coupling-out layers with increasing distance from the light source so that, in the regions in which the coupled-out light components are of a lower intensity, the number thereof is greater than in the regions in which the intensity of each coupled-out component is high.

That increase in the number of coupling-out layers provided per unit of distance length, with progressive distance from the light source, can be either continuous or stepwise in the sense that, at least at a relatively great distance, groups of coupling-out layers, which are in closely juxtaposed relationship are so designed that admittedly the mean spacings between the individual groups and the individual coupling-out layers within each group remain approximately the same, but the number of coupling-out layers provided for each group progressively increases with increasing distance from the light source.

It is also in accordance with the present invention for two or more of the above-described procedures to be combined together.

Another possibility involves the provision of a single parallelised light beam which, after passing through its light deflection device, is reflected back into itself by a mirror surface so that the remainder passes through the light deflection device in the opposite direction. In that situation, each time it passes through a coupling-out surface, a part of the returning light beam is coupled out in the direction opposite to the light-transmitting surface. Therefore, provided on the side of the light deflection device, which is opposite to the light-transmitting surface, is a reflector arrangement which reflects those rearwardly coupled-out components towards the light-transmitting surface. The intensity of the components coupled out of the returning light beam is at its greatest in the immediate proximity of the mirror surface and decreases with increasing approach to the light source, which is precisely opposite to the variation in intensity of the components coupled out of the light beam extending from the light source to the mirror surface. As the levels of intensity of the components coupled out of the forwardly passing light beam and the returning light beam are added at each location of the light deflection device, this configuration affords substantial compensation for the reduction in intensity, which occurs with increasing distance from the light source, of the individual coupled-out components.

The coupling-out layers may involve plane-parallel layers or layers which are parallel in a curved configuration. The term 'layers which are parallel in a curved configuration' is used here to denote those layers whose boundary surfaces are always at approximately the same spacing relative to each other although they extend in a curved configuration. That curved configuration can either follow a polygonal line or it can be steady with a uniform or varying radius of curvature.

To achieve special light distribution effects, the angles at which the coupling-out layers extend inclinedly relative to the longitudinal axis of the light beam can be different. It is also possible for the coupling-out layers to be arranged tiltedly relative to the vertical.

It should be expressly pointed out that the measures according to the invention can advantageously be used not only in relation to vehicle lamps which are of a height that is small in comparison with their length, as is generally the case with high-set brake lamps. Rather, in the case of vehicle lamps which are of a greater height, it is possible for a plurality of light sources to be arranged one above the other, in which case their parallelised light beams extend behind the light-transmitting surface in mutually juxtaposed relationship parallel to that surface through a common light deflection device or a plurality of mutually separate light deflection devices, in such a way that the coupled-out components pass through the light-transmitting surface at substantially uniform brightness, over the entire area thereof.

The terms 'top' or 'bottom' and 'horizontal', which are used in connection with the position of installation of high-set brake lamps, are not to be interpreted as constituting a limitation as a vehicle lamp according to the invention if necessary can also be installed in such a way that the parallelised light beam or beams extends or extend from above downwardly or from below upwardly, when passing through the associated light deflection device or devices.

It is further possible for not only narrow elongate light-transmitting openings or light covers but light-transmitting openings or light covers which are of virtually any shape and which involve a large area to be illuminated uniformly from the inside or from the rear, by means of a single one or a few light sources. In that respect the arrangement does not in any way have to be continuous or of a completely radially symmetrical configuration. In principle it is sufficient if a light guide device according to the invention extends from the center with its plane-parallel coupling-out layers only into a sector involving a generating angle of any size, for example even only a few degrees.

It is also possible in accordance with the invention for a plurality of such sectors to be arranged around a center, the sectors directly adjoining each other in terms of angle or being separated from each other by sectors which are disposed therebetween and in which there is no light guide device according to the invention. In all those various sectors, the light guide devices can be the same or for example can differ from each other in such a way that they include a different number of coupling-out layers and/or those layers are arranged at differing radial spacings from the center.

These and further advantageous features and configurations of a lamp according to the invention are set forth in the appendant claims.

Figure 6:
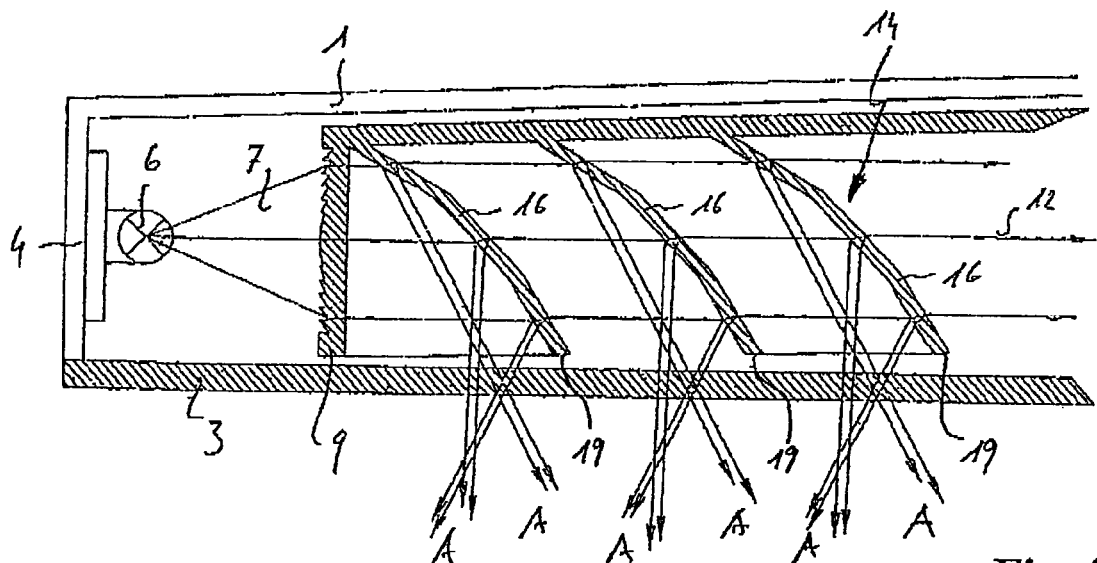
Figure 7:
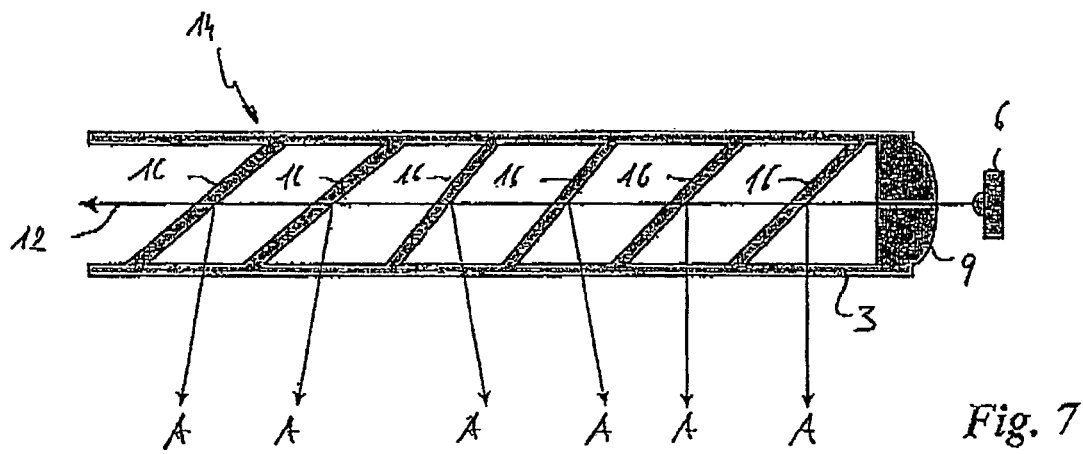
Figure 14:
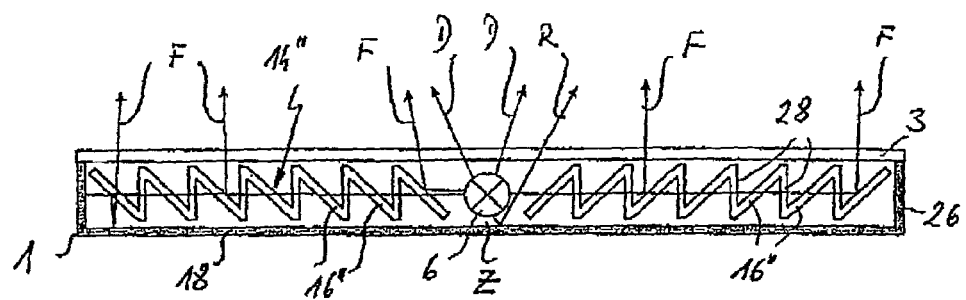
Figure 13:
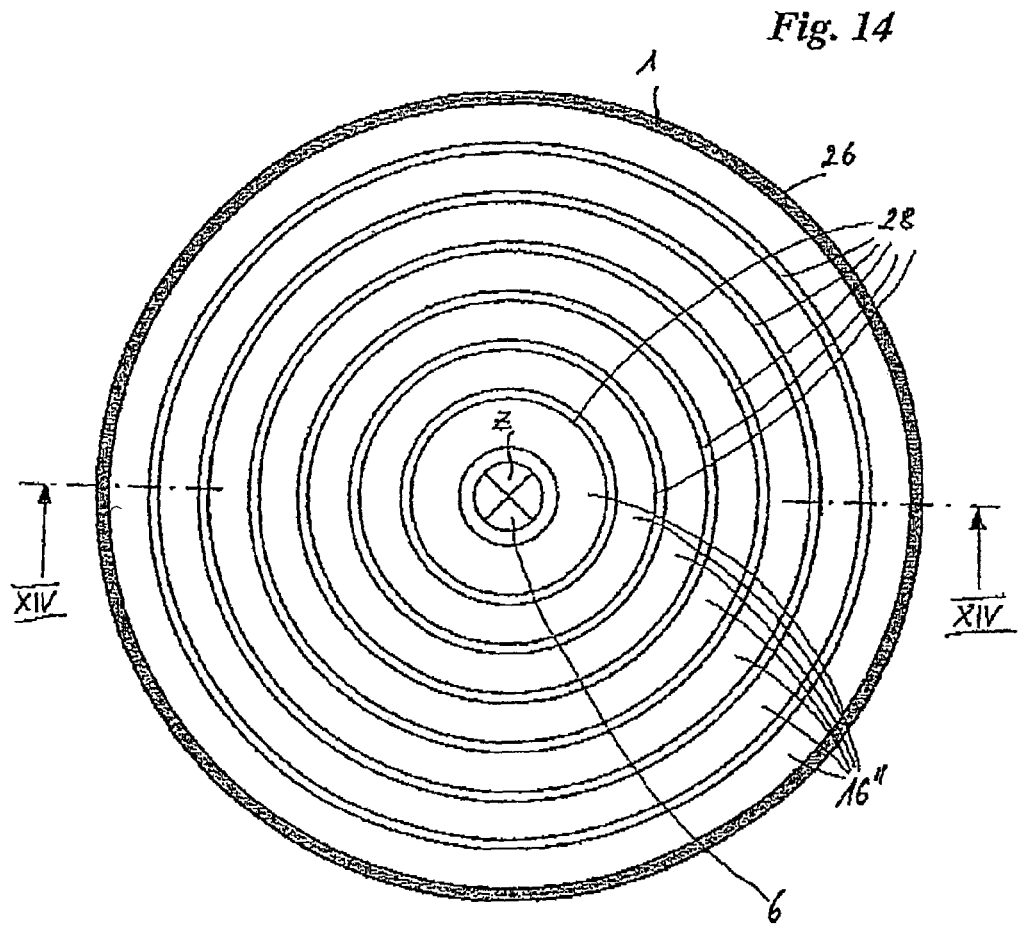
Figure 15:
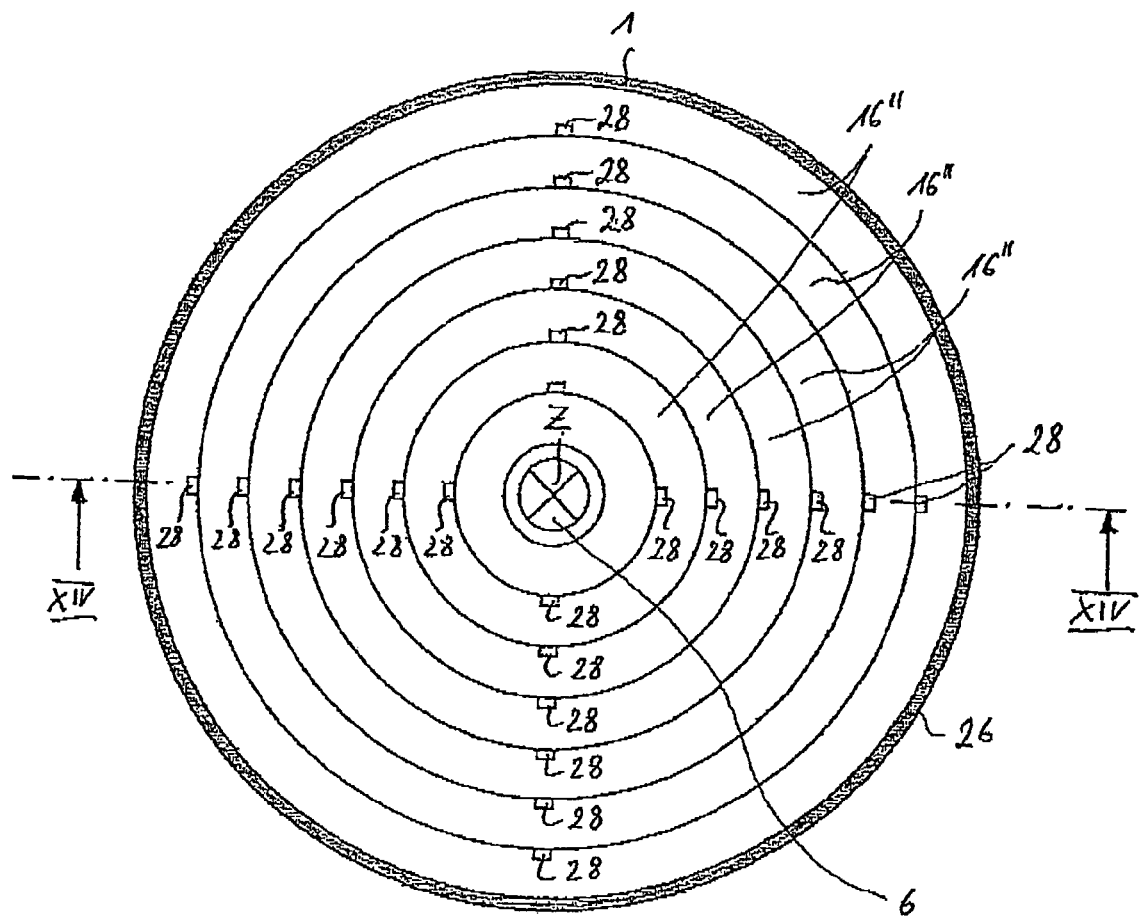
Figure 18:
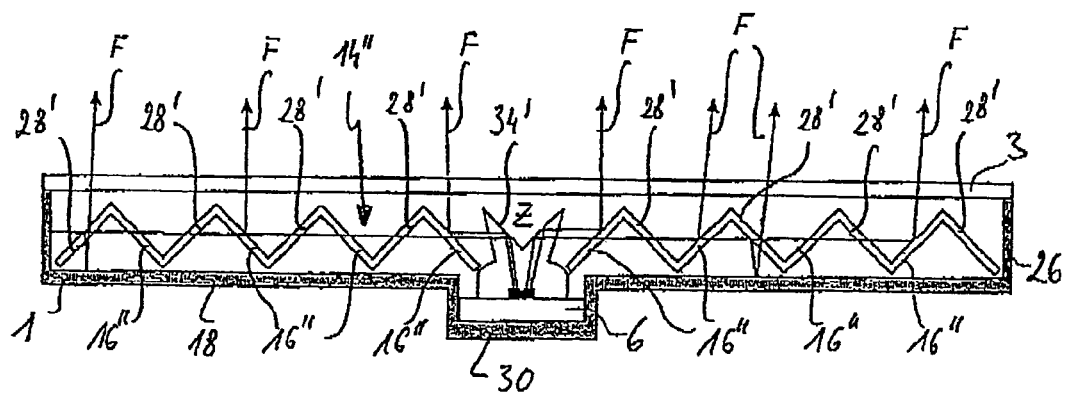
Figure 19:
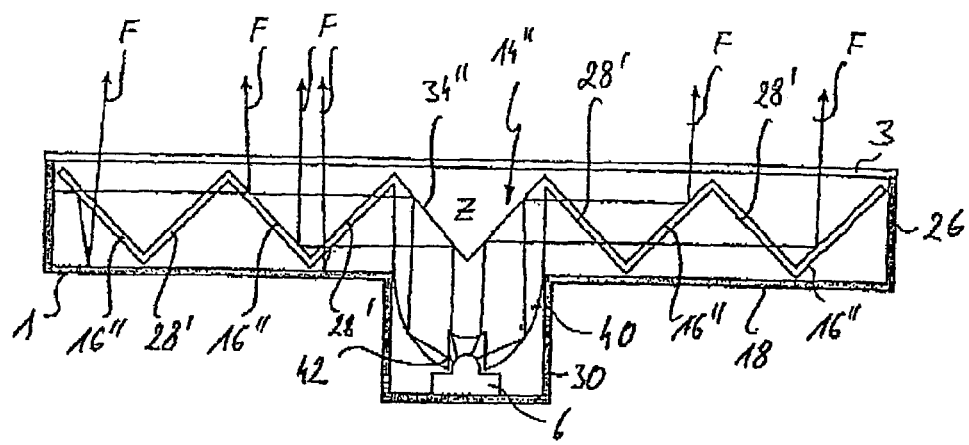
Figure 20:
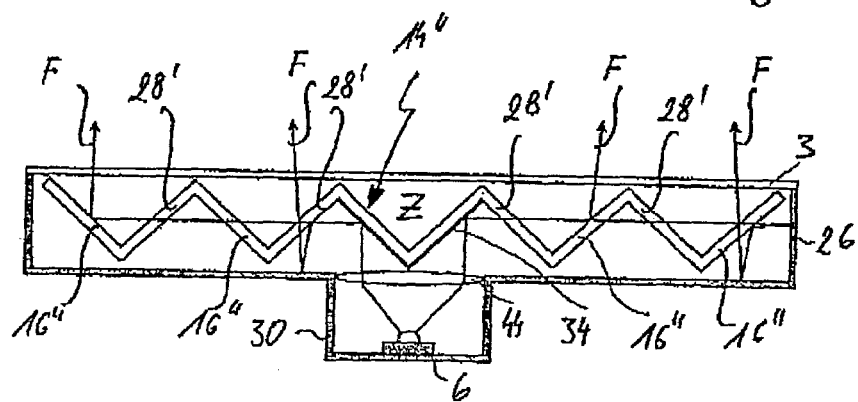
Figure 21:
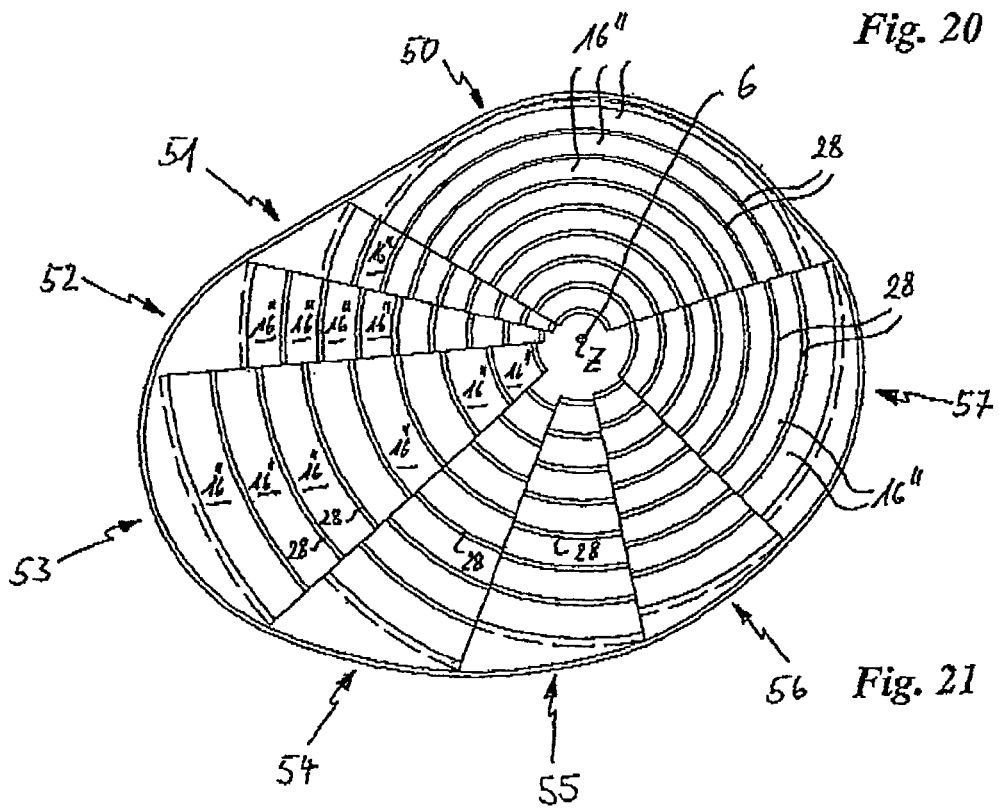
Figure 22:
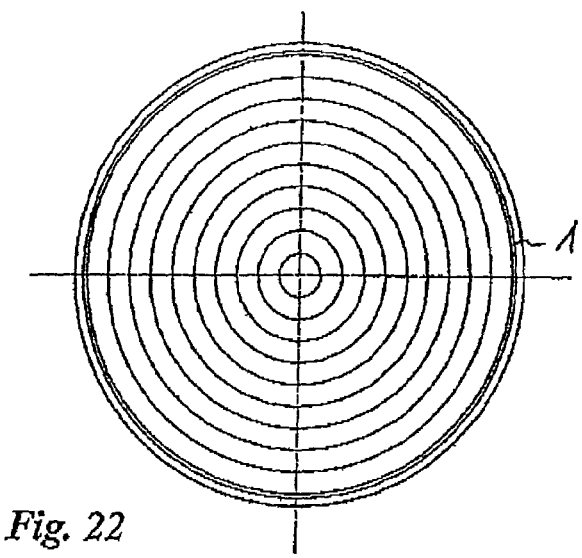
Figure 25:
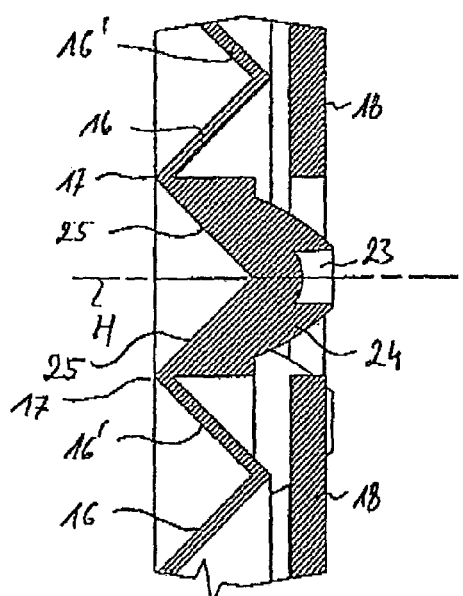
Figure 23:
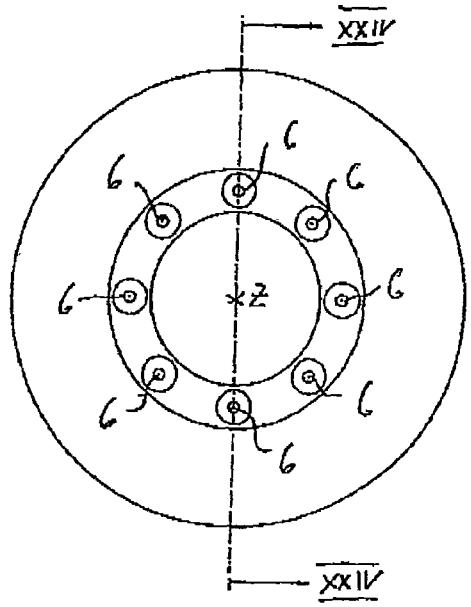
Figure 24:
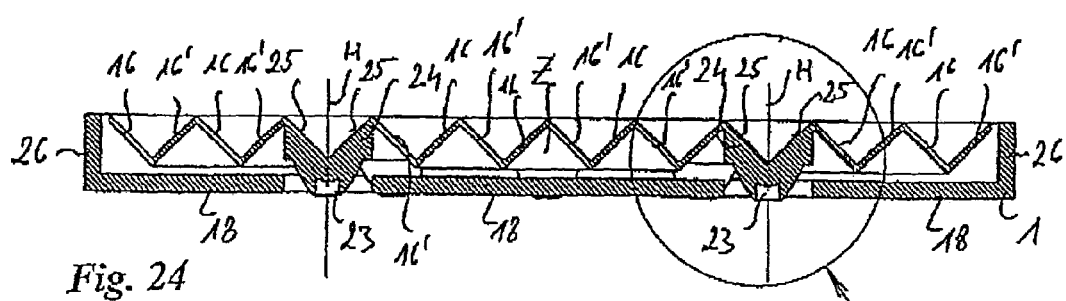

The invention is described hereinafter by means of embodiments with reference to the drawing in which:

FIG. 1a is a view in horizontal section through a lamp according to the invention with two substantially parallel light beams whose axes approximately coincide and which pass in mutually opposite directions through two interlocking light distribution devices, FIG. 1b is a view on an enlarged scale of a detail from FIG. 1a, FIG. 2a is a view corresponding to FIG. 1a of a lamp according to the invention in which the two mutually opposite substantially parallel light beams and their respectively associated light distribution devices are arranged one behind the other, as viewed from the light exit surface, FIG. 2b is a view on an enlarged scale of a detail from FIG. 2a, FIG. 3a is a view corresponding to that shown in FIG. 1a of a third embodiment of a lamp according to the invention in which the two mutually opposite substantially parallel light beams and their associated light distribution devices are arranged one beside the other, as viewed from the light exit surface, so that each of the light beams is propagated only approximately to the center of the arrangement, FIG. 3b is a view on an enlarged scale of a detail from FIG. 3a, FIG. 4 is a view corresponding to FIG. 3a in highly diagrammatic form of a further embodiment of a lamp according to the invention in which however the coupling-out layers are formed by air-filled slots in a transparent solid body, FIG. 5 is a partial horizontal section corresponding to FIG. 3b through a lamp according to the invention in which the coupling-out layers are formed by steadily curved plates with mutually 'parallel' boundary surfaces, FIG. 6 shows a partial horizontal section corresponding to FIG. 5 through a lamp according to the invention in which the coupling-out layers are formed by curved plates with mutually 'parallel' boundary surfaces, the curvature following a polygonal line, FIG. 7 shows a diagrammatic partial horizontal section through a light distribution device of a lamp according to the invention in which the coupling-out layers are formed by plane-parallel plates which extend at different angles of inclination transversely with respect to the longitudinal direction of the parallelised light beam, FIG. 8 shows a diagrammatic horizontal section through the light distribution device of a lamp according to the invention, at the ends of which the light beam coming from the light source is reflected into itself, FIG. 9 is a highly diagrammatic horizontal section through two light distribution devices which are integrally connected to each other and arranged in mutually juxtaposed relationship, for two mutually opposite light sources whose light beams are propagated through both light distribution devices, FIG. 10 shows a front view of a lamp according to the invention with light coupling-in regions both at the two ends thereof and also in the center of its linear extent, FIG. 11 shows a rear view of the lamp illustrated in FIG. 10, FIG. 12 shows a view in section through the lamp of FIGS. 10 and 11 taken along line XII—XII, FIG. 13 shows a front view of a lamp according to the invention with a circular light exit surface in which the centrally arranged light source is directly visible, FIG. 14 shows a view in section through the lamp of FIG. 13 taken along line XIV—XIV, FIG. 15 is a plan view corresponding to FIG. 13 of a lamp according to the invention with a slightly modified light distribution device, in which the section along line XIV—XIV in FIG. 14 is unchanged, FIG. 16 is a plan view of a further embodiment of a lamp according to the invention with a circular light exit surface, in which the central light source is not directly visible from the exterior, FIG. 17 is a view in section through the lamp of FIG. 16 taken along line XVII—XVII, FIG. 18 is a view in section corresponding to FIG. 17 through a further embodiment of a lamp according to the invention having a centrally arranged light emitting diode, in the housing of which is integrated a reflector arrangement, FIG. 19 is a view in section corresponding to FIG. 17 through a lamp according to the invention with a centrally arranged light emitting diode and a light guide body which is integrally connected to the light distribution device and which serves both as a light converging lens and also as a reflector arrangement, FIG. 20 is a view in section corresponding to FIG. 17 through a further embodiment of a lamp according to the invention with a converging lens positioned in front of the centrally arranged light emitting diode and a reflector arrangement integrated into the light distribution device, FIG. 21 is a plan view corresponding to FIG. 13 of a lamp according to the invention in which the light exit surface and the light cover are of a shape differing from a circular shape, FIG. 22 shows a front view of a circular lamp according to the invention in which light is coupled in not from the center but through a plurality of light emitting diodes arranged on a concentric circle, FIG. 23 shows a rear view of the lamp of FIG. 22, FIG. 24 is a view in section on an enlarged scale through the lamp of FIGS. 22 and 23 taken along line XXIV—XXIV, and FIG. 25 is a view on an even larger scale showing the detail emphasised by the circle XXV in FIG. 24.

Referring to FIGS. 1a and 1b, shown therein is a view in longitudinal section, which in the position of installation extends horizontally, through the elongate housing 1 of a high-set brake lamp according to the invention, which is of a substantially box-shaped configuration and which is closed at its front side, which faces downwardly in the Figures, by a light-transmitting cover 3.

Arranged in the interior of the housing at each of the two narrow ends 4, 4' is a light source 6, 6', whose initially divergent light beam 7, 7' passes through a Fresnel lens 9, 9' and is thereafter propagated in the form of a substantially parallel light beam towards the respectively opposite end 4' and 4 respectively. In that case the substantially coincident central axes 12, 12' extend approximately parallel to the light-transmitting cover 3 at a spacing behind same, which spacing approximately corresponds to half the depth of the housing.

Associated with each of the two parallel light beams is a light distribution device 14, 14' including a plurality of coupling-out layers 16, 16' which are here in the form of substantially plane-parallel plates comprising a transparent material whose refractive index differs from that of the air which fills the intermediate spaces between the coupling-out layers 16, 16'.

The coupling-out layers 16 associated with the light source 6 are inclined at an angle of about 45° with respect to the central axis 12 of that light beam so that a part of the light which comes from the light source 6 and which initially impinges on the front boundary surface thereof and then on the rear boundary surface thereof is reflected towards a light exit surface defined by the apexes 17, which face downwardly in the Figures, of the zig-zag structure formed by the coupling-out layers 16, 16'. In the present case that light exit surface is not a physical surface but forms in the mathematical sense the envelope of the apexes 17 of the zig-zag structure and approximately coincides with the rear side of the light-transmitting cover 3.

The light reflected towards the light exit surface by the coupling-out layers 16 impinges from the rear on the light-transmitting cover 3 and passes outwardly therethrough, as indicated by the arrows A. The part of the light beam 6 which is coupled out in that way is in each case less than the respective component which, after passing through the coupling-out layer 16 in question, is further propagated with a certain degree of parallel displacement rearwardly (that is to say away from the light-transmitting cover 3), to the oppositely disposed end 4'.

A corresponding consideration also applies in regard to the light distribution device 14' with its plane-parallel plates 16', which is associated with the light source 6'.

As the two light distribution devices 14 and 14' are arranged in mutually interlocked condition in such a way as to give the zig-zag structure which can be clearly seen in the sectional views in FIGS. 1a and 1b, each of the parallel light beams, after passing through a coupling-out layer 16 and 16' respectively of the associated light distribution device 14 and 14', passes through a coupling-out layer 16' and 16 respectively of the 'foreign' light distribution device which is associated with the other light beam.

The coupling-out layers 16' and 16 in the respective foreign light distribution device 14' and 14 respectively are at such an inclination relative to the central axes 12 and 12' respectively of the light beams that the component of the light beam in question, which is coupled out through one of those foreign coupling-out layers, is not reflected forwardly towards the light-transmitting cover 3 but rearwardly. In order not to lose those light components the coupling-out layers 16 and 16' of the light distribution devices 14 and 14' respectively are connected by a common rear wall 18 which is mirrored or provided with totally reflecting triple prism arrangements, in such a way that it reflects the rearwardly coupled-out light components so that, after passing through the respective plane-parallel plate 16 or 16' respectively, they pass forwardly to the light exit surface of the light distribution device 14 and 14' respectively and thus the light-transmitting cover 3 and issue therethrough.

As a proportion of each of the light beams is coupled out when it passes through one of the coupling-out layers 16, 16', the intensity of the light flux which is further propagated in the longitudinal direction decreases after each passage through a coupling-out layer. The same also applies in regard to the coupled-out components as the intensity thereof is for example always about 10% of the intensity of the light incident on the respective coupling-out layer 16 and 16' respectively. If therefore only the light source 4 shown at the left in the Figures, with its associated light distribution device 14, were provided, then the intensity of the light which is emitted through the light-transmitting cover 3 would decrease greatly from left to right (as viewed in the Figures). Compensation in respect of that unacceptable unequal distribution of brightness is implemented by the light source 6' arranged on the right-hand side, with its associated light distribution device 14', in which the drop in brightness is in precisely opposite relationship. In that way the entire light-transmitting cover 3 can be equally illuminated from the rear at least to such an extent that the differences in brightness are no longer strikingly apparent to the human eye or the statutory requirements are met.

A further advantageous effect of using light distribution devices 14, 14' which are arranged in mutually interlocking relationship, that is to say with alternately inclined coupling-out layers 16, 16', is that one thereof will always eliminate again the rearward parallel displacement of the light beams, which is caused by the other one, so that the spacing of the central axes 12, 12' from the light-transmitting cover 3 does not increasingly change.

As can be seen from FIGS. 1a and 1b the light-transmitting cover 3 has on its inside an optically active structure which can be used to make the intensity of the issuing light still more uniform or which can be provide for focusing the issuing light in specific desired spatial angle regions.

In the embodiment shown in FIGS. 2a and 2b in which identical parts are denoted by the same references as in FIGS. 1a and 1b, the two light sources 6, 6' and their associated light distribution devices 14, 14' are so arranged that they are one behind the other, as viewed from the light exit surface or the light cover 3. That arrangement provides that each of the substantially parallel light beams passes only through the coupling-out layers 16 and 16' respectively of the associated light distribution device 14 and 14' respectively. That avoids light components being coupled out rearwardly and the mirrored rear wall 18 of the embodiment shown in FIGS. 1a and 1b can be omitted. On the other hand however it is then necessary to accept a greater structural depth. In this case the immaterial light exit surface of the light distribution devices is defined or spanned by the front edges 19, which are downward in the Figures, of the coupling-out layers 16.

In addition the parallel displacement of the respective central axes 12, 12' of the light beams is no longer compensated by virtue of passing through the coupling-out layers 16' and 16 respectively, which are inclined in opposite directions, of the respective foreign light distribution device 14, 14', but such parallel displacement is added from one passage through the coupling-out layers to another, so that, with increasing distance from the respective light source 6 and 6' respectively, the line connecting the respective central axis portions assumes a progressively increasing spacing relative to the light-transmitting cover 3. In order nonetheless to be able to make full use of the entire light beam cross-section therefore the coupling-out layers 16 and 16' respectively on the side at the left in FIGS. 2a and 2b, in a direction perpendicular to the light-transmitting cover 3, must be of larger dimensions than the coupling-out layers 16 and 16' respectively on the side which is at the right in those Figures.

In this embodiment the last surface 20 and 20' respectively which is inclined relative to the central axis 12 or 12' and on which the light beam in question impinges is advantageously fully mirrored so that at same the entire remaining intensity is coupled out towards the light cover 3.

In the embodiment shown in FIGS. 3a and 3b the two light distribution devices 14 and 14' are so arranged that they are in mutually juxtaposed relationship, as viewed from the light exit surface or the light-transmitting cover 3. Each of the two substantially parallel light beams is thus propagated only from the associated end 4 or 4' to approximately the center of the overall arrangement and thus serves only for illuminating the left and the right half respectively of the light-transmitting cover 3. As it is not possible with that arrangement for one of the two light beams to compensate the reduction in intensity of the respective other light beam, such reduction becoming greater with an increasing distance from the light source, this embodiment provides that the spacings between the individual coupling-out layers 16 and 16' respectively progressively decrease with increasing distance from the light source 6 and 6' respectively.

That provides that fewer but on the other hand brighter light components are coupled-out in the immediate proximity of the light source per unit of length in the longitudinal direction while on the other hand more light components of lower intensity are coupled out in the proximity of the center, so that overall this arrangement again affords substantially uniform illumination of the light-transmitting cover 3.

In this case also the respective last inclined surfaces 20, 20' are advantageously fully mirrored. In order to be able to make use of the entire cross-section of the light beams in spite of the rearward parallel displacement of the central axes 12, 12', both the longitudinal axes and also the light exit surfaces of the two light distribution devices 14 and 14' respectively, which surfaces are defined by the front edges 19, 19' of the coupling-out layers 16, 16', are inclined relative to the longitudinal axis of the light-transmitting cover 3 at a small acute angle, in mutually opposite relationship, thereby affording the 'bent' configuration which can be clearly seen in FIG. 3a.

Instead of the continuous reduction in the spacings between the coupling-out layers as shown in FIG. 3a, it is also possible for them to be at least partially combined together in groups, in which case the mean spacings of the groups and also the spacings of the coupling-out layers within a group remain the same but the number of coupling-out layers provided for each group increases with increasing distance from the light source.

That is shown in highly diagrammatic manner in the embodiment illustrated in FIG. 4 in which the coupling-out layers are not formed by plane-parallel plates but by approximately plane-parallel, air-filled intermediate spaces between transparent solid body elements. Once again, at the end of each light distribution device there is a fully mirrored surface 20 and 20' respectively. This embodiment also has the above-mentioned angled arrangement of the two light distribution devices 14, 14'.

FIGS. 5 and 6 each show a view in horizontal section through the left-hand part of a lamp according to the invention which essentially differs from the preceding embodiments in that the coupling-out layers 16 are not formed by plane-parallel plates but by plates which are curved in the plane of the section, in which respect the curvature is a steady one in FIG. 5 while in FIG. 6 it follows a polygonal line. The essential consideration with both arrangements is that different cross-sectional regions of the parallelised light beam are no longer coupled out in mutually parallel relationship but in different directions, as is indicated by the arrows A. In that way it is possible to use a light-transmitting cover 3 without an optically active structure and nonetheless to achieve a light distribution effect which differs from purely parallel illumination therethrough. Thus, it is possible within wide limits to achieve virtually any light distribution arrangements by virtue of a variation in the curvatures of the coupling-out layers 16 both in the plane shown in section in FIGS. 5 and 6 and also the plane perpendicular thereto. It is also in accordance with the present invention, within a light distribution device, for plane-parallel and curved coupling-out layers to be combined together.

In both the examples shown in FIGS. 5 and 6, the immaterial light-transmitting surface is defined by the front edges 19, which are downward in those Figures, of the coupling-out layers 16.

Referring to FIG. 7 shown therein in highly diagrammatic manner is a view in horizontal section through the right-hand part of a light distribution device 14 according to the invention, with associated light source 6, in which the coupling-out layers 16 are again formed by plane-parallel plates which however involve in part the same and in part different angles of inclination relative to the central axis 12 of the parallelised light beam, so that the light components which are coupled out thereby extend in part in mutually parallel relationship and in part in different directions, as is indicated by the arrows A. Unlike the embodiments described with reference to FIGS. 5 and 6, here it is not different cross-sectional regions of the parallelised light beam but portions which occur in succession in the longitudinal direction, that are coupled out in different directions to achieve the desired light distribution. Here the light-transmitting surface is a physical surface and coincides with the rear side of the light-transmitting cover 3.

The same also applies for FIG. 8 showing a view in horizontal section through a light distribution device 14 according to the invention, which is provided in one piece with the light-transmitting cover 3, wherein the latter carries a cushion-type optical means which is provided here for achieving a given light distribution effect. On the side at the right in FIG. 8, behind the last coupling-out layer 16, is a mirror surface 20 so arranged that the remainder, which persists after passing through the coupling-out layers 16, of the light beam coming from the light source 6 at the left and parallelised by the Fresnel lens 9, is reflected back into itself by the mirror surface 20, so that the reflected remainder passes through the coupling-out surfaces 16 in the opposite direction, in which case its central axis substantially coincides with the central axis 12 of the light beam from the light source 6. A part of the light beam returning after reflection at the mirror surface 20 is coupled out again at each coupling-out layer 16, but that part, by virtue of the 'false' inclination of the coupling-out surfaces 16, is not passed towards the light-transmitting cover 3 but rearwardly. In order not to lose those light components, provided at the rear side, that is to say the side of the light distribution device 14 which is opposite to the light-transmitting cover 3, is a mirror surface 18 which reflects the light impinging thereon towards the light-transmitting cover 3.

The intensity of the light beam reflected at the mirror surface 20 is at its greatest when passing through the coupling-out surface 16 which is entirely at the right, and experiences an increasing reduction, the greater the amount by which the light beam is propagated towards the left. Conversely, the intensity of the light coming from the light source 6 is at its lowest, after passing through the coupling-out surface which is entirely at the right. As the intensities of the components of the forward and returning light beams, which are coupled out in each longitudinal portion of the light distribution device 14, are added, that arrangement thus provides a certain degree of compensation for the reduction in intensity which occurs due to the light repeatedly passing through coupling-out layers and which, particularly in the case of vehicle lamps whose longitudinal extent in the direction of propagation of the light beam is not particularly great, is readily sufficient to achieve a brightness distribution over the entire length thereof, which is uniform at least in terms of perception by the human eye.

FIG. 9 is a view in horizontal section through two mutually juxtaposed light distribution devices 14, 14' which are integrally connected together and with each of which is associated a respective light source 6 and 6' whose light beams, after being rendered parallel by the Fresnel lenses 9 and 9', are propagated in mutually opposite directions along their mutually aligned central axes 12 and 12' respectively. In this case, no mirrored surface is provided at the end of each light distribution device 14 and 14' respectively so that what remains of each of the two light beams, after passing through the associated light distribution devices 14 and 14' respectively, can be further propagated unimpededly through the oppositely disposed light distribution device 14' and 14 respectively, in which case as will be noted a component of the light is coupled out rearwardly, that is to say away from the light-transmitting cover 3, at each coupling-out surface 16' and 16. In order not to lose those light components, provided on the rear of the light distribution device 14, 14' is a continuous mirror surface 18 which reflects the light impinging thereon towards the light-transmitting cover 3, the rear side of which forms the light-transmitting surface.

This arrangement also means that the intensity of the light component which is coupled out from each of the two light beams is at its weakest where the intensity of the light component coupled out of the respective other light beam is at its strongest, so that this arrangement once again affords a certain degree of compensation for the brightness losses which occur over the length of the arrangement.

It should be noted once again that, in all the embodiments described hereinbefore, a plurality of light sources can be arranged in mutually superposed relationship, perpendicularly to the plane of the drawing. Then, in the case of those vehicle lamps which are greater in height, the optical structures which are provided on the light-transmitting cover 3 or on a separate component or which are provided integrally with the light distribution device 14 and which serve to produce a particular light distribution effect can be formed for example by cushion optical means or cylindrical lenses extending over the entire length and/or the entire width of the arrangement.

FIGS. 10 through 12 are diagrammatic views showing the structure of an elongate lamp in which light emitting diodes 6 are used as light sources 8 in order to feed the light fluxes required for illuminating the light-transmitting surface into two mutually juxtaposed light deflection devices 14, 14'. As can be seen from the rear view in FIGS. 11, in this case there are always two light emitting diodes 6 which are arranged 'one above the other' transversely with respect to the longitudinal extent of the lamp in order to impart a greater height to the illuminated surface.

The two light guide devices 14 and 14', each of which is of a zig-zag configuration in the above-described manner, are admittedly arranged in mutually juxtaposed relationship, but they are separate from each other in terms of the light procedures involved.

As FIGS. 11 and 12 show, four light emitting diodes are positioned in the center of the lamp in such a way that the light of the one pair is fed into the light guide device 14 at the left and that of the other pair into the light guide device 14' at the right. For that purpose the light emitting diodes are pushed from the rear into prism-like light guide bodies 24 in such a way that the light thereof is incident from the rear on to an inclined deflection surface 25, wherein the angle of that surface 25 with respect to the main beam direction of the incident light or the refractive index of the material of the light guide body 24 and that of the surrounding air are so selected that the respective deflection surface 25 allows the minor part of the light impinging thereon to pass therethrough in a straight line and deflects the major component approximately at a right angle in such a way that it is propagated as a light flux through the adjacent light deflection device 14 and 14' respectively. That provides that, in the front view in FIG. 10, those regions of the light-transmitting surface, behind which the light guide bodies 24 are arranged, are also lit in operation and do not appear in the form of dark surfaces. Provided at the outer ends of the two light guide devices 14, 14' are corresponding light guide bodies 24 which feed in the light from the light emitting diodes 6 arranged behind them, in the form of a light flux which is propagated towards the center. The deflection surfaces 25 of those light guide bodies are of the same nature as was described hereinbefore so that the outward regions of the light-transmitting surface are also lit. Since, as already mentioned above, the zig-zag arrangement of the coupling-out layers 16, 16 means that a part of the light passing therethrough is coupled out rearwardly, that is to say towards the rear wall 18 of the housing, that rear wall 18 is mirrored in order to be able to make use of the light components impinging thereon for illumination of the light-transmitting surface which here once again is defined by the apexes 17 of the zig-zag arrangement.

FIGS. 13 and 14 show a first embodiment of a non-linear lamp including a housing 1 with a light-transmitting surface which is circular in plan view, and a flat, also circular light-transmitting cover 3.

Arranged at the center Z of the housing is a light source 6 which is shown in the form of an incandescent lamp, being disposed directly behind the light-transmitting cover 3 which emits its light in all directions, that is to say forwardly directly through the light-transmitting cover 3 (arrow D), parallel thereto, that is to say in a horizontal direction in FIG. 14, and also rearwardly towards the rear wall 18 of the housing 1.

To make the light emitted parallel to the light-transmitting cover 3 visible to a person viewing it, the arrangement includes a light distribution device 14" including a plurality of coupling-out layers 16", each of which is formed by a plane-parallel plate in the form of a frustoconical surface whose central axis of symmetry extends approximately perpendicularly to the plane of the light-transmitting cover 3 through the center Z of the lamp. The illustrated embodiment has seven coupling-out layers 16" of that kind, the central axes of symmetry of which coincide so that they extend in concentric rings at uniformly increasing spacings in the peripheral direction around the center Z.

As the coupling-out layers 16" involve a different refractive index from the medium surrounding them, they reflect a part of the light flux which impinges on them from the light source 6 transversely to the propagation plane thereof, which is parallel to the light-transmitting cover 3, in such a way that it impinges from the rear on the light-transmitting cover 3 and issues therethrough towards the viewer, as indicated by the arrows F. In that respect the precise direction of emission of the coupled-out light components can be varied within wide limits by a variation in the angle of inclination of the individual coupling-out layers 16" with respect to the direction of propagation of the light from the light source 6, so that it is possible to achieve widely varying light distribution effects.

The main part of the light impinging on each of the coupling-out layers 16" however passes through them in a straight line, at most with a slight parallel displacement, in order then to impinge on the next, radially further outwardly disposed coupling-out layer 16" which again couples out a part of the light towards the light-transmitting cover 3. In that respect, there is an increasing reduction in intensity both in respect of the light which is further propagated and also in respect of the respective light components which are coupled out, from the center Z towards the edges.

That reduction in intensity is at least partially compensated by virtue of the fact that the inside surfaces both of the cylindrical peripheral wall 26 of the housing and also the rear wall 18 are mirrored. As a result the light passing through the radially outermost plane-parallel coupling-out layer 16" is reflected by the inside of the peripheral wall 26 of the housing so that it is again propagated substantially parallel to the light-transmitting cover 3 but in the opposite direction, that is to say towards the center Z, and in that case again impinges on the radially outermost coupling-out layer 16". In that situation again a part of the light is coupled out, because of the opposite inclination of the coupling-out layer 16" however not towards the light-transmitting cover 3 but towards the rear wall 18 so that the light impinging thereon is reflected by virtue of the above-mentioned mirroring, so that the main component thereof passes from the rear through the outermost coupling-out layer 16" and passes through the light-transmitting cover 3 outwardly in the direction of the arrow F. A corresponding process is repeated at each further plane-parallel layer towards the center Z.

The intensity of the light flux which returns from the mirrored inside of the peripheral wall 26 of the housing towards the center Z further decreases at each passage through one of the coupling-out layers 16", by virtue of the described coupling-out processes. While therefore the intensity of the light flux passing to the exterior from the center Z is at its greatest in the immediate proximity of the center Z and at its lowest in the region of the peripheral wall 26, the intensity of the returning light flux is precisely the converse. That provides for partial compensation for the last-mentioned reduction in intensity.

A further compensation effect can be afforded for example if, in a similar manner to the lamp described hereinbefore with reference to FIGS. 3a and 3b, the plane-parallel coupling-out layers 16", with an increasing distance from the center Z, are arranged at progressively smaller mutual radial spacings so that the decreasing intensity of the individual coupled-out light components is at least partially compensated by the increasing frequency thereof. A group-wise arrangement of the coupling-out layers 16", in which the mean radial spacings of the individual groups admittedly remain the same but the number of plane-parallel coupling-out layers for each group increases, can be provided to achieve illumination of the light cover which is as uniform as possible, as is the case in similar form with the linear lamp described hereinbefore with reference to FIG. 4.

The mirroring on the inside of the rear wall 18 can provide that the light which is emitted by the light source 6 directly towards the rear wall can also be deflected in such a way that it passes outwardly, as indicated by the arrow R.

In order to connect the coupling-out layers 16" which in the present case are made from a transparent plastic material to form an integral light distribution device 14", there is provided a plurality of connecting legs 28 which are arranged substantially perpendicularly to the plane of the light-transmitting cover 3 so that the light which is propagated outwardly from the center or inwardly from the mirrored inside of the peripheral wall 26 of the housing passes approximately in a straight line and without a noticeable coupling-out effect therethrough. As shown, in this case the connecting legs 28 connect the upper peripheral edge of each radially further inwardly disposed coupling-out layer 16" to the lower peripheral edge of the next outer coupling-out layer 16".

In the embodiment shown in FIGS. 13 and 14 the connecting legs 28 extend over the entire periphery, thereby affording a highly stable light distribution device 14".

As certain light losses occur in the transparent connecting legs 28, the preferred embodiment illustrated in FIG. 15 provides that the connecting legs 28, in the peripheral direction, are only of a very small extent, but in that case they are arranged in four groups distributed over the periphery at equal angular spacings. Otherwise the lamp shown in FIG. 15 is identical to the lamp described hereinbefore with reference to FIGS. 13 and 14.

In the embodiment illustrated in FIGS. 16 and 17, the light source 6 which is again in the form of an incandescent lamp is arranged in a recess 30 in the rear wall 18 in a hollow mirror 32 which projects its light upwardly on to a reflector arrangement 34 which is in the form of mirroring on a peripheral surface of a cone, which faces towards the light source 6. The spread angle of that peripheral cone surface is so selected that the light impinging thereon, after reflection, is propagated substantially parallel to the light-transmitting cover 3 from the center towards the peripheral wall 26 of the housing. The consequence of the presence of a reflector arrangement 34 is that, as can be seen from FIG. 16, the lamp has a circular darkened surface region 36 in the region of the center Z and the light source 16 is not directly visible.

The light flux which is propagated from the reflector arrangement 34 towards the peripheral wall 26 of the housing and from the mirroring thereof back to the center Z again impinges on a plurality of coupling-out layers 16" which are arranged in the same manner as described with reference to FIGS. 13 through 15 so that the desired coupling-out effects again occur thereat.

A further difference in relation to the above-described embodiment is that the connecting legs 28' are inclined approximately at the same angle relative to the direction of propagation of the light coming from the center Z but in the opposite direction to the coupling-out layers 16", thus affording a generally zig-zag arrangement.

That severe inclination of the connecting legs 28' which here extend over the entire periphery of the arrangement has the consequence that at each thereof, a part of the light flux propagated from the center towards the peripheral wall 26 of the housing, is coupled out towards the rear wall 18. Provided there is a mirror 38 which is in one piece with the hollow mirror 32 and which reflects the light impinging thereon towards the light-transmitting cover 3. Provided on the inside of the peripheral wall 26 of the housing is a cylindrical mirror 39 which performs the same function as was described hereinbefore for the mirroring on the inside surface of the peripheral wall 26 of the housing.

The transparent connecting legs 28' which are of a plane-parallel configuration act, in relation to the light returning from the cylindrical mirror 39 to the center Z, in the same manner as the coupling-out layers 16" for the light passing outwardly from the center Z, that is to say they each couple out a respective component directly towards the light-transmitting cover 3 while the coupling-out layers 16" each couple out a respective component of the returning light towards the mirror 38 which then reflects it towards the light-transmitting cover 3. That again provides a compensation effect for the reduction in intensity, which is progressive for the light passing theretowards, with increasing distance from the center Z.

In the present embodiment the mirrors 32, 38 and 39 form a one-piece mirror arrangement which upon assembly can be fitted from above into the housing 1. As can be seen in particular from FIG. 17 the reflector arrangement 34 is integrally connected to the light distribution device 14" formed by the coupling-out layers 16" and the connecting legs 28' thereof. That therefore overall affords a lamp which comprises only a few parts and which can be assembled in a simple and inexpensive manner.

The embodiment illustrated in FIG. 18 differs from that shown in FIGS. 16 and 17 essentially in that the central reflector arrangement 34' is not integrated into the light distribution device 14" but is formed by the specifically shaped housing of the light emitting diode used as the light source 6. At its side which is upward in FIG. 18, that transparent housing has a conical recess which is directed towards the light emitting surface of the diode and the spread angle of which is so selected that the light which impinges thereon from below in the form of a comparatively narrow beam is deflected in a horizontal direction by total reflection so that it is propagated substantially parallel to the light-transmitting cover 3 through the light distribution device 14" which in that way, as was described hereinbefore, couples out at each coupling-out layer 16" and each connecting leg 28' light components which are emitted through the light-cover layer 3 either directly or after reflection at the mirroring of the rear side 18 of the housing 1.

The embodiment shown in FIG. 19 differs from that shown in FIG. 17 essentially in that integrated into the light distribution device 14" is a dome-shaped light guide body 40 which projects downwardly into the recess 30 in the housing. Provided in the dome surface of the dome-shaped light guide body 40, which is towards the light source 6 in the form of a light emitting diode, is a central recess 42, into which the housing of the light emitting diode 6 projects. The end face of the recess 42, which is opposite to the light emitting diode, is in the form of a converging lens. Overall, the light guide body 40 collects the light emanating from the light source 6 and passes it vertically upwardly in FIG. 19 on to its top side in the form of a cone facing with its tip downwardly, which deflects the light impinging thereon in a horizontal direction by total reflection and thus serves as a reflector arrangement 34″. All other elements are the same as or identical to the embodiments of FIGS. 17 and 18.

The same also applies in regard to the embodiment illustrated in FIG. 20, with the exception of the fact that here the arrangement has a light emitting diode which emits in a narrow spatial angle as the light source, wherein disposed in the beam path thereof is a converging lens 44 which renders parallel the light from the light source 6 and projects it from below on to the reflector arrangement 34 which is again formed in one piece with the light distribution device 14″. A Fresnel lens can also be used as the converging lens 44.

FIG. 21 shows a plan view of a lamp according to the invention, the configuration in plan of which differs markedly from the above-described circular shape. This lamp also has a center Z at which the light source 6 is disposed. Arranged around that center are circular segments 50 through 57 which involve different radii. Provided in each of those segments is its own light distribution device which is of a configuration corresponding to that shown in FIGS. 13 and 14, in which case however the individual coupling-out layers 16″ in the various segments 50 through 57 are at different radial spacings from each other and also in each case from the center Z. For the sake of clarity of the drawing only some of the coupling-out layers 16″ and some of the connecting legs 28 thereof are provided with a reference.

FIGS. 22 through 24 show an embodiment of a circular lamp according to the invention.

As can be seen in particular from FIGS. 23 and 24, this arrangement has a plurality of light sources 6 in the form of light emitting diodes which do not illuminate the light guide arrangement 14, 14' from the center Z but which are arranged on a circle, the spacing of which from the center Z is approximately equal to half the radius of the lamp. In that way this lamp has eight light sources 6, the light from each of which is fed by way of a respective light guide body 24 into the adjacent light deflection device in such a way that it is propagated both radially inwardly and also radially outwardly. In this case also the deflection surfaces 25 of the light guide bodies are so designed that they allow a minor part of the light impinging thereon from the rear to pass through in a straight line and they deflect a major part in the horizontal direction in FIG. 24.

As will be seen each of the light guide bodies 24 is provided at its rear side with a recess 23 serving to receive the light emitting diodes which are not shown in FIGS. 24 and 25. The light emitting diodes are introduced into those recesses 23 in such a way that the central ray of the light beam issuing therefrom extends substantially in the direction of the axes H. The light guide bodies 24 used in the present case primarily differ from those of the embodiment described with reference to FIGS. 10 through 12, in that they have two deflection surfaces 25, that is to say they deflect the light of a single light emitting diode in two directions, that is to say both radially inwardly and also radially outwardly. In both cases the light guide bodies 24 can advantageously be formed in one piece with the coupling-out layers 16, 16' of the light deflection devices 14, 14', and are produced jointly therewith for example in an injection molding process.

As the light deflection devices 14, 14' in this case also are again arranged in a zig-zag shape, the inside of the rear wall 18 of the housing is mirrored, as was described hereinbefore. The same applies in regard to the inside surface of the cylindrical peripheral wall 26 of the housing.

It should be expressly pointed out that the actual beam paths are shown only in part or not at all, for the sake of clarity of the drawing, in the above-described sectional views of FIGS. 14, 17 through 20 and 24 and 25. It is clear to the man skilled in the art that the coupling-out and reflection processes which are illustrated at individual coupling-out layers 16, 16', 16″ or connecting legs 28, 28' and at the mirroring on the rear sides 18 and the peripheral walls 26 only at individual locations occur in the same manner at all corresponding locations.

Instead of being filled with air the intermediate spaces between the coupling-out layers can also be filled with another gas or with another solid material which involves a different refractive index.

The light sources are preferably light emitting diodes (LEDs).

Admittedly, in relation to some illustrated embodiments, two mutually oppositely directed, parallelised light beams with associated light distribution device 14 and 14' are illustrated, but it is possible, particularly in the case of less elongate vehicle lamps, to provide only one light beam and one light distribution device, and for the drop in brightness to be compensated by the measures described in relation to FIGS. 3 and 4 for each of the left and right sides thereof or a combination of such measures.

What is claimed is:

1. A lamp which, in a plane parallel to a light exit surface, is at least partially symmetrical with respect to a center (Z), said lamp including
   at least one light source,
   a light distribution device being also at least partially symmetrical with respect to said center in said plane and comprising light coupling-out structures and defining said light exit surface, the light of the at least one light source being fed into the light distribution device to produce a light flux which is firstly propagated through the light distribution device substantially parallel to the light exit surface and in a radial direction with respect to the center (Z) and from which light flux light components are deflected by means of the coupling-out structures for delivery through the light exit surface, the coupling-out structures comprising a plurality of coupling-out layers which are arranged at spacings in succession in the direction of propagation of the light flux and which comprise a medium whose optical refractive index is different from that of the medium filling intermediate spaces between said layers,
   wherein the coupling-out layers are so inclined relative to the propagation direction of the light flux at a predetermined angle that its main component passes through them without a substantial change in direction while a minor part is reflected towards the light exit surface.

2. A lamp as set forth in claim 1
   wherein the light of at least one light source is fed into the light distribution device from the center (Z).

3. A lamp as set forth in claim 1
   wherein the light of at least one light source is fed into the light distribution device from a location spaced radially from the center (Z).

4. A lamp as set forth in claim 1
   wherein the light distribution device is of a different configuration in various sectors around the center (Z).

5. A lamp as set forth in claim 4 wherein the coupling-out layers are at different radial spacings from each other in at least two different sectors.

6. A lamp as set forth in claim 4 wherein coupling-out layers in at least two different sectors are at different radial spacings from the center (Z).

7. A lamp as set forth in claim 1 wherein the at least one light source is arranged in the plane of the light distribution device, the light delivered thereby in the direction of the light exit surface passes directly therethrough and the light delivered thereby substantially parallel to the light exit surface forms the light flux through the coupling-out layers.

8. A lamp as set forth in claim 1 wherein the at least one light source is arranged behind the light distribution device as viewed from the light exit surface and further including a reflector arrangement for deflecting the light emanating from the light source thereby to form the light flux through the coupling-out layers.

9. A lamp as set forth in claim 8 including means for propagating a plurality of light fluxes in different directions and associated with each of said plurality of light fluxes its own light distribution device each including a plurality of coupling-out layers.

10. A lamp as set forth in claim 9 including means for propagating at least two of the light fluxes towards each other.

11. A lamp as set forth in claim 10 wherein said propagating means are operable to cause the at least two of the light fluxes to at least partially pass through each other.

12. A lamp as set forth in claim 11 wherein the light distribution devices associated with the at least two light fluxes are arranged in interlocking relationship, and further including on the side of the two light distribution devices which is in opposite relationship to the light exit surface a reflection device operable to reflect the parts of each light flux, which are reflected by the coupling-out layers of the light distribution device belonging to the respective other light flux towards same, towards the light exit surface.

13. A lamp as set forth in claim 10 wherein said propagating means are operable to cause the at least two of the light fluxes to be propagated away from each other.

14. A lamp as set forth in claim 9 wherein at least two of the light fluxes are derived from one and the same light source.

15. A lamp as set forth in claim 9 wherein each of the plurality of light fluxes is derived from its own light source.

16. A lamp as set forth in claim 1 including for each light source an optical imaging device operable to substantially parallelise the light flux before it is fed into an associated light distribution device.

17. A lamp as set forth in claim 1 wherein light distribution devices belonging to different light fluxes are arranged in mutually juxtaposed relationship as viewed from the light exit surface.

18. A lamp as set forth in claim 1 wherein light distribution devices belonging to different light fluxes are arranged in successive relationship as viewed from the light exit surface.

19. A lamp as set forth in claim 1 wherein the spacings of mutually adjacent coupling-out layers of a light distribution device decrease with increasing distance from the feed-in location.

20. A lamp as set forth in claim 1 wherein the coupling-out layers are formed by thin plates of a transparent material having an optical refractive index different from that of the medium surrounding them.

21. A lamp as set forth in claim 20 wherein the coupling-out layers are integrally connected to each other.

22. A lamp as set forth in claim 21 wherein thin connecting legs of a transparent material which extend between the coupling-out layers transversely with respect to the propagation direction of the respective light flux, thereby defining in section a zig-zag-shaped arrangement.

23. A lamp as set forth in claim 22 wherein the thin connecting legs are so inclined relative to the propagation direction of the light flux impinging thereon that light passing through them substantially maintains its propagation direction.

24. A lamp as set forth in claim 22 wherein the thin connecting legs are so inclined relative to the propagation direction of the light flux impinging thereon that they couple out a part thereof in a direction opposite to the light exit surface, and further including behind the light distribution device as viewed from the light exit surface a reflector operable to reflect that light towards the light exit surface.

25. A lamp as set forth in claim 22 wherein the thin connecting legs are narrow perpendicularly to the propagation direction of the light flux impinging thereon so that they form at least one leg extending in the propagation direction of the light flux impinging thereon.

26. A lamp as set forth in claim 21 including connecting legs connecting the light coupling-out layers together, the connecting legs extending outside the light flux in the propagation direction thereof.

27. A lamp as set forth in claim 1 wherein the medium of the coupling-out layers is air and a medium filling intermediate spaces there between is a transparent solid body material.

28. A lamp as set forth in claim 27 wherein the coupling-out layers are in the form of slots in an integral body comprising the solid body material.

29. A lamp as set forth in claim 1 wherein all coupling-out layers have at least substantially the same optical properties.

30. A lamp as set forth in claim 1 including a mirrored surface so positioned that after passing through a plurality of coupling-out layers the light flux impinges thereon, the mirrored surface being inclined relative to the longitudinal direction of the light flux at a predetermined angle thereby operable to reflect the remaining residual light impinging thereon towards the light exit surface.

31. A lamp as set forth in claim 1 including a mirrored surface so positioned that after passing through a plurality of coupling-out layers the light flux impinges thereon, the mirrored surface thereby being operable to reflect it in such a way that the propagation direction of the reflected light flux is approximately opposite to that of the arriving light flux, and further including on the side of the light deflection device opposite to the light exit surface a reflection device operable to reflect the parts of the reflected light flux, which are coupled out by the coupling-out layers of the light deflection device through which the light has passed towards same, back towards the light exit surface.

32. A lamp as set forth in claim 1
wherein at least one of the coupling-out layers is a substantially plane-parallel layer.

33. A lamp as set forth in claim 1
wherein at least one of the coupling-out layers is a layer which is parallel in a curved configuration following a polygonal line in cross-section.

34. A lamp as set forth in claim 1
wherein at least one of the coupling-out layers is a layer which is steadily curved in cross-section and having front and rear sides which extend substantially at a uniform spacing relative to each other.

35. A lamp as set forth in claim 1
wherein at least two coupling-out layers are so designed that the light flux portions coupled out thereby extend substantially parallel to each other.

36. A lamp as set forth in claim 1
wherein at least two coupling-out layers are so designed that the light flux portions coupled out thereby extend in mutually different directions.

37. A lamp including
at least one light source,
a light distribution device comprising light coupling-out structures and defining a light exit surface, the light of the at least one light source being fed into the light distribution device to produce a light flux which is firstly propagated through the light distribution device substantially parallel to the light exit surface and from which light components are deflected by means of the coupling-out structures for delivery through the light exit surface, the coupling-out structures comprising a plurality of coupling-out layers which are arranged at spacings in succession in the direction of propagation of the light flux and which comprise a medium whose optical refractive index is different from that of the medium filling intermediate spaces between said layers,
wherein the coupling-out layers are so inclined relative to the propagation direction of the light flux at a predetermined angle that its main component passes through them without a substantial change in direction while a minor part is reflected towards the light exit surface and
wherein the coupling-out layers of said light distribution device are combined to form groups which are arranged at a spacing from each other in the direction of propagation of the associated light flux and the number of coupling-out layers per group increases with increasing distance from the feed-in location into the light distribution device in question.

38. A lamp as set forth in claim 37
wherein the spacings of mutually adjacent groups of coupling-out layers decrease with increasing distance from the feed-in location into the light distribution device in question.

39. A lamp as set forth in claim 37
wherein the spacings of mutually adjacent coupling-out layers of a light distribution device decrease with increasing distance from the feed-in location.

40. A lamp as set forth in claim 37
wherein the coupling-out layers are formed by thin plates of a transparent material having an optical refractive index different from that of the medium surrounding them.

41. A lamp as set forth in claim 40
wherein the coupling-out layers are integrally connected to each other.

42. A lamp as set forth in claim 41
wherein thin connecting legs of a transparent material which extend between the coupling-out layers transversely with respect to the propagation direction of the respective light flux, thereby defining in section a zig-zag-shaped arrangement.

43. A lamp as set forth in claim 42
wherein the thin connecting legs are so inclined relative to the propagation direction of the light flux impinging thereon that light passing through them substantially maintains its propagation direction.

44. A lamp as set forth in claim 42
wherein the thin connecting legs are so inclined relative to the propagation direction of the light flux impinging thereon that they couple out a part thereof in a direction opposite to the light exit surface, and further including behind the light distribution device as viewed from the light exit surface a reflector operable to reflect that light towards the light exit surface.

45. A lamp as set forth in claim 42
wherein the thin connecting legs are narrow perpendicularly to the propagation direction of the light flux impinging thereon so that they form at least one leg extending in the propagation direction of the light flux impinging thereon.

46. A lamp as set forth in claim 41 including
connecting legs connecting the light coupling-out layers together, the connecting legs extending outside the light flux in the propagation direction thereof.

47. A lamp as set forth in claim 37
wherein the medium of the coupling-out layers is air and a medium filling intermediate spaces there between is a transparent solid body material.

48. A lamp as set forth in claim 47
wherein the coupling-out layers are in the form of slots in an integral body comprising the solid body material.

49. A lamp as set forth in claim 37
wherein all coupling-out layers have at least substantially the same optical properties.

50. A lamp as set forth in claim 37 including
a mirrored surface so positioned that after passing through a plurality of coupling-out layers the light flux impinges thereon, the mirrored surface being inclined relative to the longitudinal direction of the light flux at a predetermined angle thereby operable to reflect the remaining residual light impinging thereon towards the light exit surface.

51. A lamp as set forth in claim 37 including
a mirrored surface so positioned that after passing through a plurality of coupling-out layers the light flux impinges thereon, the mirrored surface thereby being operable to reflect it in such a way that the propagation direction of the reflected light flux is approximately opposite to that of the arriving light flux,
and further including on the side of the light deflection device opposite to the light exit surface a reflection device operable to reflect the parts of the reflected light flux, which are coupled out by the coupling-out layers of the light deflection device through which the light has passed towards same, back towards the light exit surface.

52. A lamp as set forth in claim 37 wherein at least one of the coupling-out layers is a substantially plane-parallel layer.

53. A lamp as set forth in claim 37 wherein at least one of the coupling-out layers is a layer which is parallel in a curved configuration following a polygonal line in cross-section.

54. A lamp as set forth in claim 37 wherein at least one of the coupling-out layers is a layer which is steadily curved in cross-section and having front and rear sides which extend substantially at a uniform spacing relative to each other.

55. A lamp as set forth in claim 37 wherein at least two coupling-out layers are so designed that the light flux portions coupled out thereby extend substantially parallel to each other.

56. A lamp as set forth in claim 37 wherein at least two coupling-out layers are so designed that the light flux portions coupled out thereby extend in mutually different directions.

* * * * *